US012530748B2

(12) United States Patent
Jerripothula et al.

(10) Patent No.: US 12,530,748 B2
(45) Date of Patent: Jan. 20, 2026

(54) AUTOMATED RADIAL BLURRING BASED ON SALIENCY AND CO-SALIENCY

(71) Applicant: Adeia Imaging LLC, San Jose, CA (US)

(72) Inventors: Koteswar Rao Jerripothula, New Delhi (IN); Dhananjay Lal, Englewood, CO (US); Ning Xu, Irvine, CA (US); Reda Harb, Issaquah, WA (US)

(73) Assignee: Adeia Imaging LLC, San Jose, CA (US)

( * ) Notice: Subject to any disclaimer, the term of this patent is extended or adjusted under 35 U.S.C. 154(b) by 353 days.

(21) Appl. No.: 18/129,215

(22) Filed: Mar. 31, 2023

(65) Prior Publication Data

US 2024/0331107 A1    Oct. 3, 2024

(51) Int. Cl.
*G06T 5/70* (2024.01)
*G06T 7/00* (2017.01)
*G06T 7/20* (2017.01)
*G06V 10/25* (2022.01)

(52) U.S. Cl.
CPC .............. *G06T 5/70* (2024.01); *G06T 7/20* (2013.01); *G06T 7/97* (2017.01); *G06V 10/25* (2022.01)

(58) Field of Classification Search
CPC ..... G06T 5/70; G06T 7/97; G06T 7/11; G06T 7/194; G06T 11/60; G06T 19/006; G06T 7/20; G06T 2207/20164; G06T 7/136; G06T 5/50; G06T 17/00; G06V 10/25; G06F 16/5838; G06K 9/4671

USPC ....................................................... 382/100
See application file for complete search history.

(56) References Cited

U.S. PATENT DOCUMENTS

| 7,860,337 | B2 | 12/2010 | Zimmer |
| 8,554,021 | B2* | 10/2013 | Kletter ..................... G06K 9/54 |
| | | | 382/306 |
| 2016/0284070 | A1* | 9/2016 | Pettigrew et al. ...... G06T 5/008 |
| 2018/0211393 | A1* | 7/2018 | Chen et al. ............. G06T 7/194 |
| 2018/0352191 | A1* | 12/2018 | Eppolito et al. ...... H04N 7/0117 |
| 2020/0265565 | A1* | 8/2020 | Hwang et al. ............ G06T 5/20 |
| 2021/0004962 | A1* | 1/2021 | Tsai et al. ................. G06T 7/11 |
| 2023/0014805 | A1* | 1/2023 | Verma et al. ........... G06T 5/002 |

OTHER PUBLICATIONS

"Circular blurring of image online," [retrieved on Dec. 30, 2022 from URL: https://www.imgonline.com.ua/eng/blur-angular.php] (2 pages).

(Continued)

*Primary Examiner* — Matthew C Bella
*Assistant Examiner* — Daniel Joseph Santos
(74) *Attorney, Agent, or Firm* — HALEY GUILIANO LLP

(57) ABSTRACT

Systems and methods are described for automatically performing automated radial blurring. A plurality of images may be accessed, and saliency parameters may be determined based on at least one of the plurality of images. Co-saliency parameters may be determined based on the plurality of images. A region of interest (ROI) in the at least one of the plurality of images may be determined based on the saliency parameters and the co-saliency parameters. Automated radial blurring of the at least one of the plurality of images may be performed based on the identified ROI.

20 Claims, 11 Drawing Sheets

(56) References Cited

OTHER PUBLICATIONS

"Contour features," [ URL: https://docs.opencv.org/3.4/dd/d49/tutorial_py_contour_features.html] (4 pages).
"Design blur: Radial blur," Jul. 12, 2018 [URL: https://play.google.com/store/apps/details?id=designblur.photo.android.app.addquick&hl=en_US&gl=US&pli=1] (4 pages).
"Font meme: Blur images," [rertieved from URL: https://fontmeme.com/blur-images on Dec. 30, 2022] (2 pages).
"How to create a radial blur effect in photoshop (step by step)," [retrieved on Jan. 2, 2023 from URL: https://expertphotography.com/radial-blur-photoshop/] (17 pages).
"Meme tutorial—3 ways on how to make a motion/radial blur meme," [retrieved on Dec. 30, 2022 from URL: https://www.iskysoft.com/video-editing/blur-meme.html] (8 pages).
"Online photo editor (batch processing)," [retrieved on Dec. 30, 2022 from URL: https://anytools.pro/en/img/editor] (2 pages).
"Radial blur + literally anything = the big funny," [retrieved on Jan. 2, 2023 from URL: https://www.facebook] (6 pages).
"Radial blur action effect in photoshop," [retrieved on Nov. 24, 2022 from URL: https://www.photoshopessentials.com/photo-effects/radial-blur-action-effect-photoshop/] (17 pages).
"Radial blur for photo online," [retrieved on Dec. 30, 2022 from URL: https://www.imgonline.com.ua/eng/blur-radial.php] (2 pages).
"Radial blur lens," [retrieved on Jan. 3, 2023 from URL: https://lens.snapchat.com/56f3636bc56d40f6af1da5eb02d04107] (2 pages).
"Radial Blur," [retrieved on Nov. 24, 2022 from URL: https://lens.snapchat.com/2a5dea53a57e4a82acd70de9e1fd8ff5] (2 pages).
"Radial Blur," [retrieved on Nov. 24, 2022 from URL: https://lenslist.co/radial-blur-2/] (2 pages).
"You can radially blur any image and it'll be funny," [retrieved on Jan. 2, 2023 from URL: https://www.vice.com/en/article/3kgjgb/you-can-radially-blur-any-image-and-itll-be-funny] (16 pages).

Chonglun, L., et al., "Noisy Radial-blurred Images Restoration Using the BM3D Frames," The Open Cybernetics & Systemics Journal, 8(1):54-60 (2014).
Jerripothula, K. R., et al., "Image Co-Skeletonization via Co-Segmentation," IEEE Transactions on Image Processing, 30:2784-2797 (2021).
Jerripothula, K. R., et al., "Efficient video object co-localization with co-saliency activated tracklets," IEEE Transactions on Circuits and Systems for Video Technology, 29(3):744-755 (2019).
Jerripothula, K. R., et al., Quality-guided fusion-based co-saliency estimation for image co-segmentation and colocalization, IEEE Transactions on Multimedia, 20(9):2466-2477 (2018).
Jerripothula, K.R., et al., "Image co-segmentation via saliency co-fusion," IEEE Transactions on Multimedia, 18(9):1896-1909 (2016).
Liu, J., et al., "A Simple Pooling-Based Design or Real-Time Salient Object Detection," EEE CVPR:3917-3926 (2019).
Mai, L., et al., "Comparing salient object detection results without ground truth," ECCV, Part III, LNCS 8691, 76-91 (2014).
Su, Y., et al. "A Unified Transformer Framework for Group-Based Segmentation: Co-segmentation, Co-saliency Detection and Video Salient Object Detection," Journal of Latex Class Files, 14(8): 8 pages (2022).
Webster, C. B., et al., "Radial deblurring with FFTS," 2007 IEEE International Conference on Image Processing, 1: pp. I-101-I-104 (2007).
Ribaric, S., et al., "Restoration of images blurred by circular motion," IWISPA, 53-60 (2000).
Hurakadli, V., et al., "Deep learning based radial blur estimation and image enhancement," IEEE International Conference on Electronics, Computing and Communication Technologies (CONECCT), 1-5 (2019).

* cited by examiner

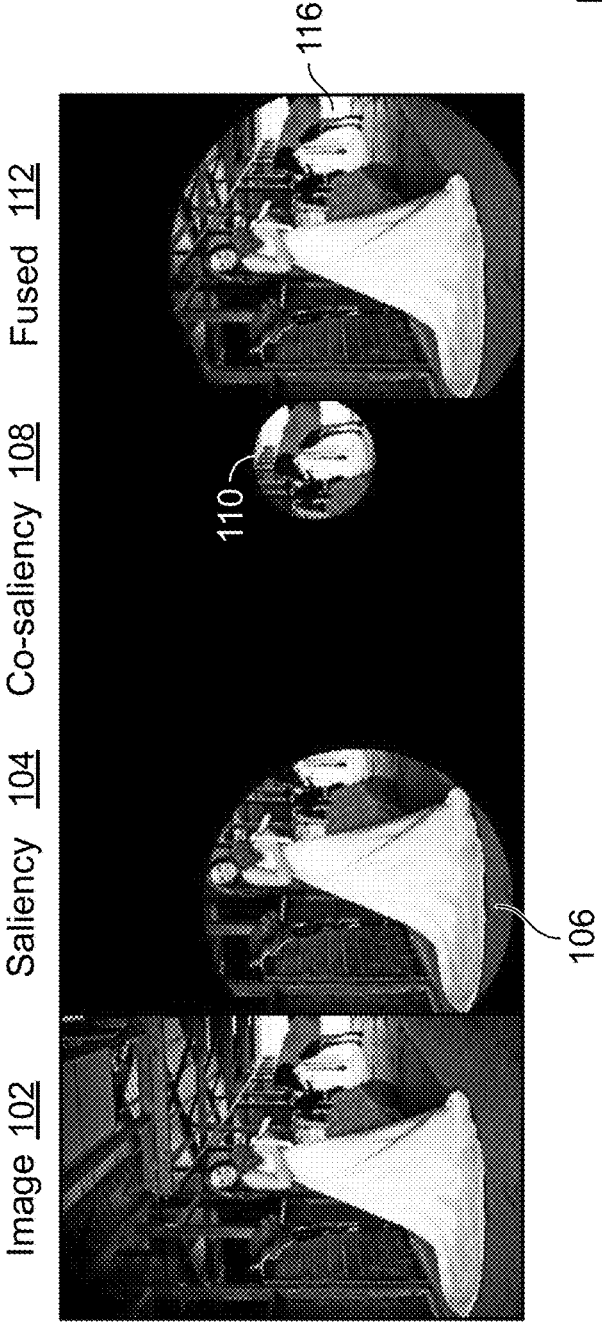
FIG. 1

AUTOMATED RADIAL BLURRING BASED ON SALIENCY AND CO-SALIENCY

BACKGROUND

This disclosure is directed to systems and methods for performing automated radial blurring of at least one of a plurality of images. More particularly, techniques are disclosed for performing the radial blurring based on identifying a region of interest (ROI) in such at least one image, based on saliency parameters and co-saliency parameters.

SUMMARY

Radial blurring is an image enhancement technique often used to create dramatic focus in images to make them more appealing. Social media users often use radial blurring to create attention-grabbing images or memes. Radial blurring can add a sense of speed (or fake motion) to images by simulating the blur produced by zooming or rotating camera. Two exemplary types of radial blur effects are (i) zoom blur, which provides the effect of a zooming camera, and (ii) spin blur, which provides the effect of a rotating camera.

In one approach, to generate a radial blur, a blur center from which the blur originates in the image is identified, where a center of the image may be assumed to be the blur center, or a user is given an option to manually specify or adjust where the center should be, which may include a particular object. In another approach, since users may desire to protect an object in the image from being blurred, the users are provided with an option to define the region of interest (ROI) by manually providing a circle encircling the object or by manually segmenting out the object. The original and blurred image can then be blended while protecting the region inside the circle or segment. However, such requirements for the user to perform manual adjustments to configure the radial blur effect limits the usefulness of radial blur in a large-scale image processing scenario, as well as for videos.

In another approach, some social media websites or apps have tried automated radial blurring using simple assumptions, by considering the center of the image itself, or the centroid of pixels satisfying a certain color range, as the blur center. While such an approach, which provides results with default settings and then allows the user to make desired adjustments, might be useful for performing radial blurring of an image or a limited number of images with fixed radial blurring parameters, such approach is deficient in handling radial blurring of a large set of images or videos, which may contain a lot of variation as between images and/or frames.

To help overcome these problems, methods, systems and apparatuses are provided herein for efficiently and effectively automating radial blurring of one or more images. In some embodiments, a plurality of images may be accessed, saliency parameters may be determined based on at least one of the plurality of images, and co-saliency parameters may be determined based on the plurality of images. An ROI may be identified in the at least one of the plurality of images based on the saliency parameters and the co-saliency parameters, and radial blurring of the at least one of the plurality of images may be performed based on the identified ROI.

Such aspects enable exploiting saliency and co-saliency parameters (or cues) in image and/or video collections to improve automated ROI detection in large-scale image processing scenarios. In some embodiments, such parameters (or cues) may be foreground-related cues readily computed in large-scale image processing scenarios and videos. In the case of videos, a motion saliency parameter or cue may additionally or alternatively be considered. ROIs identified based on such parameters can help distinguish foregrounds from backgrounds across one or more images and/or videos, making automated radial blurring a feasible prospect at large scale and/or for video(s). In some embodiments, to help protect certain objects or portions of one or more images from being modified in an undesirable manner during the radial blurring process, the techniques described herein may provide protection by way of a particular shape (e.g., circular protection), and the system may automatically determine a location of a circular ROI (and/or other ROI of a different shape) in images and/or frames of a video.

In some embodiments, the methods, systems and apparatuses disclosed herein may leverage saliency, co-saliency, or motion saliency, or any other suitable parameter or cue, or any combination thereof, to generate one or more ROIs for one or more images to facilitate the performance of radial blurring, along with the protection of foreground objects in the one or more images. With such automation, a user need not manually provide a circle or silhouette or other specification of a shape or portion of an image as an ROI for each image in a large image collection or for every video frame. In some embodiments, the methods, systems and apparatuses disclosed herein may be configured to receive as input one or more images and/or frames, extract one or more cues from the one or more input images and/or frames, encircle and/or enclose and/or segment one or more foreground objects, and render zoom and/or spin radially blurred images, while protecting the one or more foreground objects.

In some embodiments, for automation of radial blurring, e.g., that can be deployed at large scale for groups of images and/or videos, the methods, systems and apparatuses disclosed herein may employ different cue(s) such as, for example, saliency, commonness, and/or motion, or any combination thereof. Such techniques enable objects in images and/or videos to be segmented, localized, and skeletonized jointly. In some embodiments, such techniques may enable objects in images and/or videos to be encircled or enclosed, and/or may otherwise identify an ROI in images and/or videos. Co-segmentation and co-skeletonization are discussed in more detail in Jerripothula et al., "Image Co-Skeletonization via Co-Segmentation," IEEE Transaction on Image Processing 30 (2021) 2784-2797, the contents of which is hereby incorporated by reference herein in its entirety. Such automation is beneficial for many applications, such as, for example, for processing user-generated visual content stored on mobile phones and/or social media platforms. The systems and methods provided herein may provide for automatically performing radial blurring on an entire collection of images (e.g., photos and/or videos from a particular event, such as a vacation or trip, or otherwise sharing one or more common attributes) at once, without requiring a user to manually go through each image and/or frame manually to request performance of radial blurring.

In some embodiments, identifying the ROI in the at least one of the plurality of images comprises generating, based on the saliency parameters, a first bounding shape enclosing a first portion of a particular image of the plurality of images; generating, based on the co-saliency parameters, a second bounding shape enclosing a second portion of the particular image; and generating, based on the first bounding shape and the second bounding shape, a fused bounding shape enclosing each of the first portion and the second portion of the image. In some embodiments, generating the fused bounding shape is further based on a first weight representing a first quality score of the saliency parameters and a second weight representing a second quality score of the co-saliency parameters.

For example, given a collection of images and their available parameters (or cues), e.g., saliency and co-saliency, the provided systems and methods may identify a bounding circle (or other bounding enclosure or bounding shape) for each cue that encloses all foreground regions of that cue. In some embodiments, these bounding circles or bounding shapes themselves can act as potential foregrounds. In some embodiments, the methods, systems and apparatuses disclosed herein may determine quality scores of each parameter or cue to generate a fused map, and/or may perform optimization based on the fused map. In some embodiments, such optimization may be applied to video(s) by incorporating motion saliency into the framework.

In some embodiments, each respective image of the plurality of images comprises a background region and a foreground region, and a respective ROI of each of the plurality of images includes a portion of the background region and a portion of the foreground region. In some embodiments, performing the radial blurring comprises, for each respective image of the plurality of images, obtaining a respective blurred image and blending the respective blurred image with another version of the respective image using a protection mask. Such protection mask may comprise a first protection mask or a second protection mask, the first protection mask being configured to protect from blurring the portion of the foreground region and the portion of the background region, and the second protection mask being configured to protect from blurring only the portion of the foreground region.

For example, upon obtaining the shape or enclosure associated with each image, the provided systems and methods may be configured to perform radial blurring using the shape's center as the blur center, and blurred image may be blended with another version of the respective image (e.g., an original version of the image) using a protection mask. In some embodiments, the protection may be circular (or shape-based) or silhouetted, where the circular (or shaped-based) protection may protect the foreground regions as well as the background regions inside the circle or shape, and the silhouetted protection may protect only the foreground regions. In some embodiments, depending on the available parameters (or cues), the provided systems and methods may use one or more salient regions as a proxy for foreground regions to achieve automated radial blurring. In some embodiments, the radial blurring comprises a zoom blur or a spin blur or their variants or any combination thereof.

In some embodiments, the methods, systems and apparatuses disclosed herein may determine, for a particular image of the plurality of images, parameters of an optimal bounding shape by iteratively updating initial parameters of the optimal bounding shape based on the saliency parameters and the co-saliency parameters. Such iterative updating may be performed until the parameters of the optimal shape converge to a particular threshold (e.g., an optimal value) and identifying the ROI may be performed based at least in part on the optimal bounding shape. In some embodiments, the optimal bounding shape is an optimal circle, and the parameters of the optimal circle comprise an x-coordinate of a center of the circle, a y-coordinate of the center of the circle, and a radius of an ROI of the optimal circle.

In some embodiments, at least one of the plurality of images is a video, and the method further comprises determining a motion saliency parameter associated with the video, wherein identifying the ROI is performed based at least in part on the motion saliency parameter. In some embodiments, the methods, systems and apparatuses disclosed herein may access metadata associated with a collection of images, the collection of images comprising the plurality of images, and receive input of at least one criterion. The at least one criterion may be compared to the metadata of the collection of images, and upon determining that the plurality of images are associated with metadata corresponding to the at least one criterion, one or more options to enable selection of one or more of the radially blurred plurality of images may be generated for display. In some embodiments, generating for display the one or more options comprises ranking the plurality of images based at least in part on the saliency parameters and the co-saliency parameters and generating for display one or more of the radially blurred plurality of images that are ranked highest.

For example, the system may comprise or correspond to a social media platform (or any other suitable platform) configured to automatically access groups of images (e.g., photo(s) and/or video(s)) from a user profile or account (and/or from any other suitable source). For example, a grouping of images can be based on an event, based on a trip, based on a particular time period, based on presence of certain people, or based on any other suitable criterion, or any combination thereof. In some embodiments, the system may perform processing on such images by performing radial blurring on such images based on saliency and/or co-saliency, and may present the processed images to a user. The user may be provided with an option to share such processed images in any suitable manner, e.g., on a website, on an application, or with other users via an email or text message or any other suitable electronic message. In some embodiments, the techniques described herein may enable generation of circular images, or images of any other suitable shape, that may be used for a profile picture, a picture for an image posted online, or any other suitable icon or picture, or any combination thereof, such as for a social media platform, a video game platform or any other suitable platform.

In some embodiments, by determining the circular (and/or other shaped) ROI on which the radial blur is performed, the system may enable social media platforms to delight users with radial blurring effects. In some embodiments, a user may specify from a digital photo album one or more images on which radial blurring is to be performed, and the system may present the results to the user by determining the ROI using one or more cues, without the need for manual user intervention. In some embodiments, the user may be provided with an option to adjust the automatically determined ROI.

In some embodiments, the provided systems and methods may automate radial blurring by bringing the foreground of one or more images into focus, which may not always be at the image center, and may not be within a pre-defined color range. In some embodiments, the provided systems and methods may automate the protection of objects within image(s) from the effects of radial blurring while applying radial blurring to other portions of the image(s). In some embodiments, the provided systems and methods may automate user interaction for both individual images and a batch of images, and such batch processing technique may be performed on frames of a video.

In some embodiments, the techniques described herein may utilize a saliency map (e.g., saliency extraction, thresholding (e.g., Otsu's algorithm and/or any other suitable technique)) and may generate a minimum enclosing circle to protect the ROI, as part of generating an automated radial blur for an image or a set of images.

In some embodiments, the techniques described herein may utilize a co-saliency map (e.g., co-saliency extraction, thresholding (e.g., Otsu's algorithm and/or any other suitable technique)) and generate a minimum enclosing circle to protect the ROI, as part of generating automated radial blur for an image or a set of images.

In some embodiments, the techniques described herein may utilize a combination of saliency and co-saliency cues by developing a fused map, e.g., saliency and co-saliency extraction, fusing using a weighted arithmetic mean, thresholding (e.g., Otsu's algorithm and/or any other suitable technique) and may generate a minimum enclosing circle to protect the ROI, as part of generating automated radial blur for a set of images.

In some embodiments, the techniques described herein may enable using a combination of saliency and co-saliency cues by initially developing separate saliency and co-saliency maps and solving an optimization problem iteratively to converge to an optimal circle.

In some embodiments, the techniques described herein may enable performing radial blur using a silhouetted protection mask that protects salient regions from blurring instead of having to manually segment out the object.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 1-2 show illustrative processing steps for generating an ROI using saliency and co-saliency parameters (or cues), in accordance with some embodiments of this disclosure.

DETAILED DESCRIPTION

Figure 2:
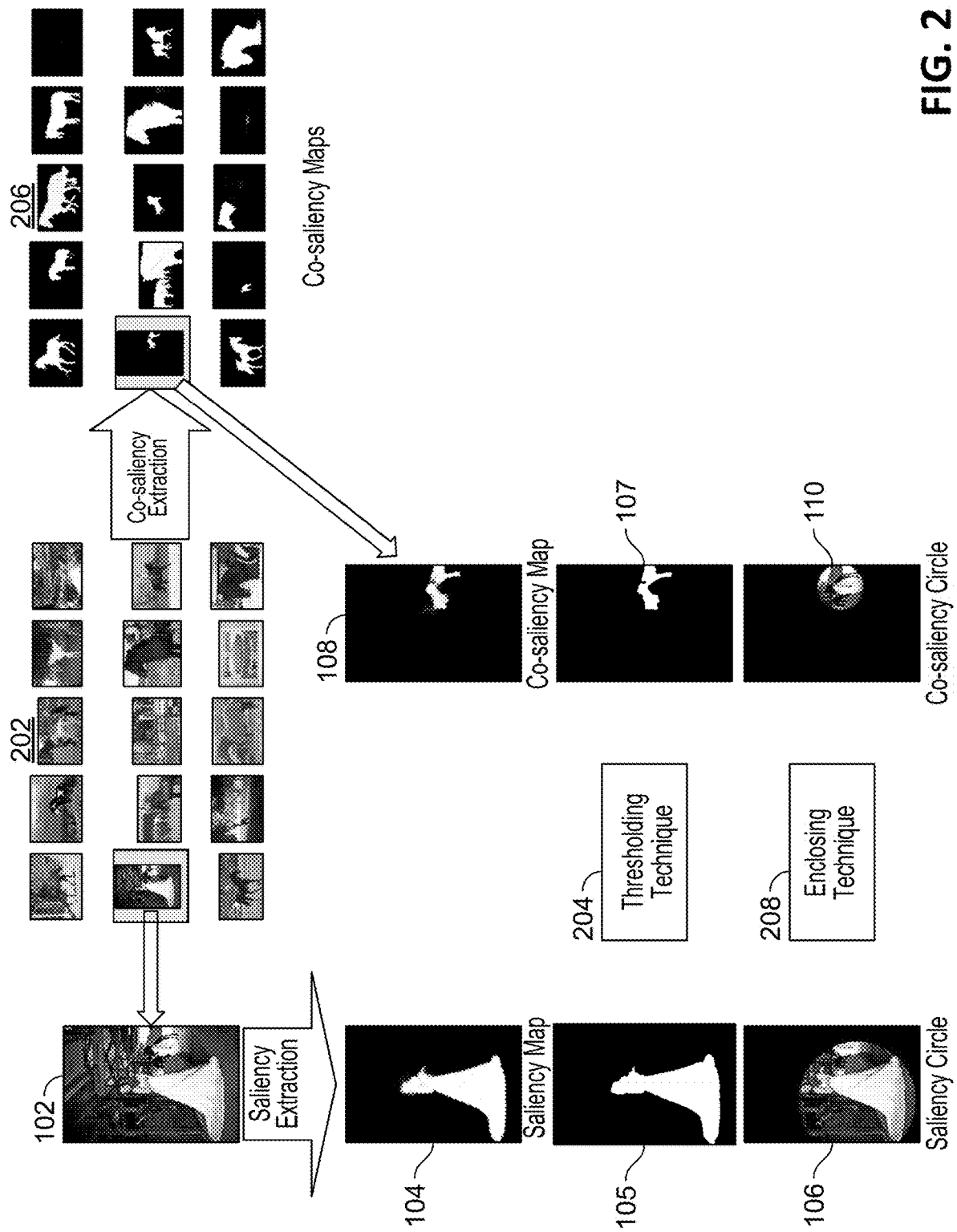

FIGS. 1-2 show illustrative processing steps for generating an ROI using saliency and co-saliency parameters (or cues), in accordance with some embodiments of this disclosure. An image processing application may access, from any suitable source, a plurality of images (e.g., images 202 in FIG. 2), and such plurality of images may include image 102. The image processing application may be executing at least in part at a computing device (e.g., computing device 800 or 801 of FIG. 8, which may be associated with a particular user) and/or at one or more remote servers (e.g., media content source 902 and/or server 904 of FIG. 9) and/or at any other suitable computing device(s). The image processing application may be configured to perform functionalities described herein. The image processing application may correspond to or be included as part of an image processing system, which may be configured to perform the functionalities described herein. In some embodiments, the image processing system may comprise or be incorporated as part of any suitable application, e.g., one or more extended reality (XR) applications, one or more video or image or electronic communication applications, one or more social networking applications, one or more image or video capturing and/or editing applications, or any other suitable application(s), one or more streaming media applications, and/or may comprise or employ any suitable number of displays, sensors or devices such as those described in FIGS. 1-9, or any other suitable software and/or hardware components, or any combination thereof.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

In some embodiments, the image processing application may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

Figure 8:
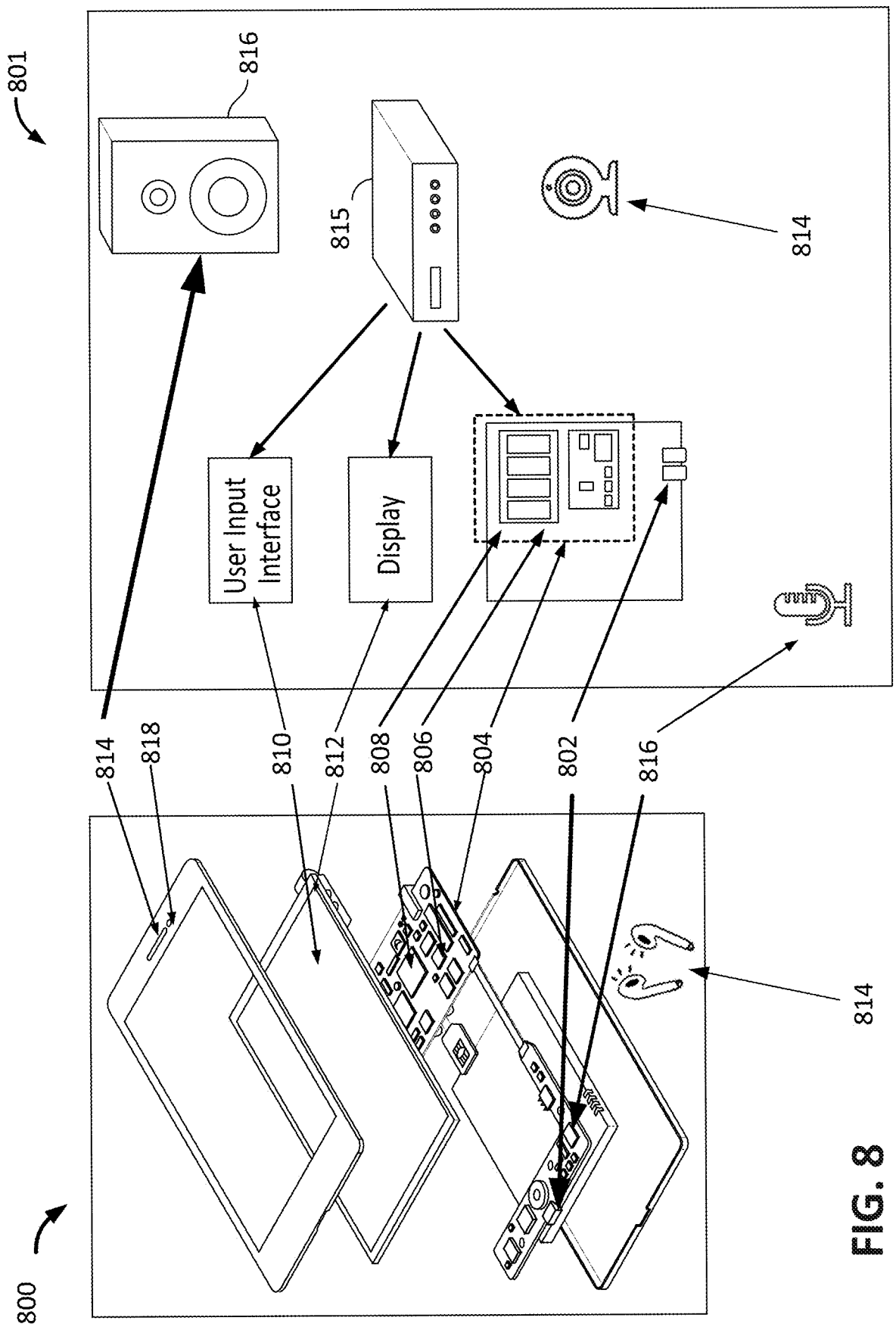
FIGS. 8-9 show illustrative devices and systems for performing radial blurring of at least one image, in accordance with some embodiments of this disclosure.
Figure 9:
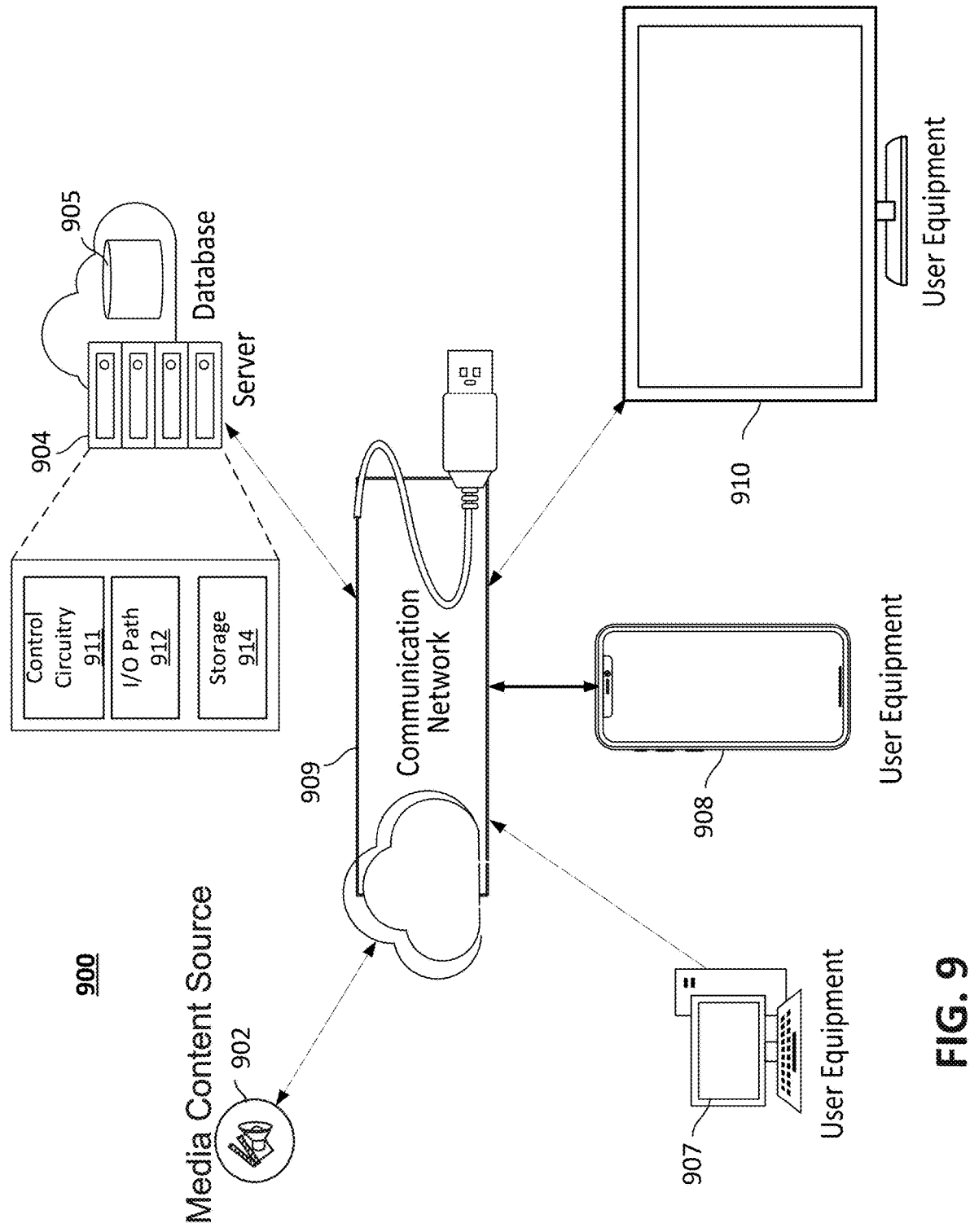

In some embodiments, the image processing system accesses a plurality of images over a network (e.g., communication network 909 of FIG. 9 or any other suitable network) stored at, for example, media content source 902 and/or server 904 of FIG. 9; may access one or more of the images from a website or application or any other suitable data source; or any combination thereof. Additionally or alternatively, the image processing system may access one or more of the images by capturing and/or generating the images, and/or retrieving the images from memory (e.g., memory or storage of device 800 or 801 of FIG. 8, or memory or storage 914 of server 904 or database 905 of FIG. 9, or any other suitable data store, or any combination thereof) and/or receiving the images over any suitable data interface, or by accessing the images using any other suitable methodology, or any combination thereof. In some embodiments, the image processing system may be configured to access, and/or perform processing on, output or transmit, the images at least in part based on receiving a user input or a user request, e.g., via user input interface 810 of FIG. 8. In some embodiments, the accessed images may each or respectively correspond to a photo, a picture, a still image, a live photo, a video, a movie, a media asset, a screenshot of a media asset, a recording, a slow motion video, a panorama photo, a GIF, burst mode images, multi-exposure extended or high dynamic range (HDR) image capture, images from another type of mode, or any other suitable image, or any combination thereof.

As referred to herein, the terms "media asset" and "content" may be understood to mean electronically consumable user assets, such as LF content, 3D content, television programming, as well as pay-per-view programs, on-demand programs (as in video-on-demand (VOD) systems), live content, Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by user equipment devices, and/or can be part of a live performance.

In some embodiments, the image processing system may access the plurality of images automatically, e.g., without receiving explicit user input to access such images. In some embodiments, the image processing system may automatically access and perform processing (e.g., pre-processing for performing automated radial blurring and/or radial blurring) on the plurality of images based on determining that the plurality of images are included in a collection of images relating to a particular category, topic, subject matter or event. For example, the image processing system may determine that metadata associated with the plurality of images indicates that such images relate to the particular category, topic, subject matter or event. In some embodiments, the metadata may be appended to or otherwise associated with one or more of the images, e.g., stored and/or provided in association with the images, based on an editor manually classifying the image, and/or based on the image processing system or other system analyzing features or objects or other information (e.g., location information) of the images to classify each image into the collection. In some embodiments, metadata may be analyzed or generated at a post-capture stage after capturing of the images and/or during capturing of the images. As another example, the image processing system may determine that all images from a particular source, or captured during a particular time period or in a particular location, correspond to a particular category, topic, subject matter or event. In the example of FIG. 1, the image processing system may determine that the plurality of images correspond to a category of wedding pictures, or more specifically wedding pictures of a bride in a stable, pictures of horses, or any other suitable classification of any suitable level of detail or granularity, or any combination thereof.

As shown in FIG. 1, the image processing system may access at least one image (e.g., image 102) of the plurality of images (e.g., images 202 of FIG. 2), and may determine (at 104) saliency parameters based on such at least one image of the plurality of images. In some embodiments, the image processing system may determine such saliency parameters based on identifying one or more salient portions of an image. In some embodiments, such one or more salient portions of an image may be automatically identified using any suitable saliency extraction technique, e.g., to identify visually prominent objects, features or other portions in at least one image. For example, an image thresholding technique, an image segmentation technique, a computer vision technique, an image processing technique, or any other suitable technique, or any combination thereof may be used to identify one or more salient portions of at least one image. In some embodiments, the image processing system may utilize one or more machine learning models (e.g., naive Bayes algorithm, logistic regression, recurrent neural network, convolutional neural network (CNN), bi-directional long short-term memory recurrent neural network model (LSTM-RNN), or any other suitable model, or any combination thereof) to localize and/or classify objects in a given image.

For example, the machine learning model may output a value, a vector, a range of values, any suitable numeric representation of classifications of objects, or any combination thereof indicative of one or more predicted classifications and/or locations and/or associated confidence values, where the classifications may be any categories into which objects may be classified or characterized. In some embodiments, the model may be trained on a plurality of labeled image pairs, where images may be preprocessed and represented as feature vectors. For example, the training data may be labeled or annotated with indications of locations of multiple objects and/or indications of the type or class of each object. In some embodiments, in determining the saliency parameters, the image processing system may employ one or more of the techniques discussed in Liu et al. "A Simple Pooling-Based Design or Real-Time Salient Object Detection," in IEEE CVPR, 2019, the contents of which are hereby incorporated by reference herein in their entirety.

In some embodiments, the image processing system may automatically determine the one or more salient portions based at least in part on using image segmentation (e.g., semantic segmentation and/or instance segmentation) and classification to identify and localize different types or classes of objects or features in an image. For example, such segmentation techniques may include determining which pixels belong to a depiction of the bride in image 102, which pixels belong to the horse in image 102, and/or which pixels should be mapped to a particular facial feature (e.g., head, nose, ear, eyes, mouth, etc.) or any other suitable portion of the object, and/or which pixels belong to a physical environment surrounding the bride and the horse, and/or which pixels belong to other entities within image 102. In some embodiments, in image 102, segmentation of a foreground and a background may be performed. Any suitable number or types of techniques may be used to identify salient and/or co-salient portions of one or more images, e.g., machine learning, computer vision, object recognition, pattern recognition, facial recognition, image processing, image segmentation, edge detection, color pattern recognition, partial linear filtering, regression algorithms, and/or neural network pattern recognition, or any other suitable technique or any combination thereof). In some embodiments, objects may be identified by extracting one or more features for a particular object, and comparing the extracted features to those stored locally and/or at a database or server storing features of objects and corresponding classifications of known objects.

Additionally, or alternatively, the image processing system may automatically determine the one or more salient portions based at least in part on determining that a ratio between a number of pixels occupied by a particular object or particular portion of an image to a total number of pixels of the image exceeds a threshold. For example, the more pixels that an object detected in an image occupies, the more likely it is that such portion may be a salient or significant portion of the image. In some embodiments, a location of a particular object (e.g., a bride in image 102) may be determined based on metadata (e.g., retrieving coordinates of one or more objects in the image), and/or based on using edge detection techniques to determine boundaries (e.g., edges, shape outline, border) of one or more objects in the image, and/or analyzing pixel values of portions of the image surrounding the one or more objects. For example, the image processing system may determine, based on detecting that brightness values or intensities of adjacent pixels abruptly change, an edge of an object, and may calculate the number of pixels of the object based on the determined edges being the perimeter of the object.

In some embodiments, the image processing system may automatically determine the one or more salient portions based at least in part on a location or position of an object in the image; e.g., an object in a center of the image may be more likely to be a salient portion of the image. In some embodiments, the image processing system may determine the one or more salient portions based at least in part on a conspicuous color scheme or formatting or attributes of one or more portions of the image. In some embodiments, the image processing system may determine the one or more salient portions based at least in part on user preferences of a particular user, e.g., determining based on a user's profile that he or she is likely to be interested in a particular type of object identified in the image, or based on preferences of users generally, e.g., based on analyzing content on a social network or other content source or other data. For example, the image processing system may determine which portions of an image an ordinary or average observer would consider significant or important (e.g., in the context of one or more of the plurality of images), or which portions of an image are likely to immediately grab the attention of an observer of the image. For example, the image processing system may determine that the context of image 102 is a wedding photo, and that a bride is the most important component (or one of the most important components) of a wedding, and thus should be considered a salient portion of image 102.

In some embodiments, the image processing system may generate, using the techniques described herein and based at least in part on identifying one or more salient portions and/or saliency parameters associated with at least one image, a saliency map (at 104 in FIGS. 1-2). For example, as shown in FIG. 2, saliency map 104 may be obtained, and a technique (e.g., Otsu's method or any other suitable technique) may be applied to saliency map 104 to generate (at 105 in FIGS. 1-2) a binary mask, e.g., to classify pixels of the image as belonging to a foreground region or a background region. In some embodiments, to perform such processing, a color RGB image may be converted to a grayscale image, and thresholding or segmentation may be applied to the grayscale image to generate the binary mask. In some embodiments, the image processing system may identify one or more portions of the image as a salient portion based on determining that such one or more portions correspond to a foreground of the image.

In some embodiments, the image processing system may, in applying a mask (at 105 in FIGS. 1-2) to image 102, identify and set pixels corresponding to the bride to a first pixel value (e.g., 255 representing a white color), and identify and set pixels corresponding to other portions to a second pixel value (e.g., 0 representing a black color). As shown in FIG. 2, the image processing system may access image 102 from a plurality of images 202, which may correspond to images captured by one or more devices of one or more users or may correspond to images returned based on an Internet search for key words (e.g., "horses" and/or "brides") or may correspond to images from any other suitable source. The image processing system may perform any suitable saliency extraction technique on image 102 to obtain saliency parameters, e.g., a saliency map (at 104), and further processing (e.g., Otsu's thresholding, or any other suitable image processing technique, at 204) may be performed to perform thresholding and/or obtain a further processed saliency map.

In some embodiments, the image processing system may generate a bounding shape or other bounding mechanism based at least in part on the saliency parameters, and the bounding shape may surround a perimeter of and enclose a portion of the image determined to be a salient portion of the image. The bounding shape may be any suitable shape (e.g., a circle, a box, a square, a rectangle, a polygon, an ellipse, or any other suitable shape, or any combination thereof). The bounding shape may be calculated in any suitable manner, and may be fitted to particular objects and/or portions of an image using any suitable technique. For example, the bounding shape may be drawn to surround the identified edges of an object, or identified edges of a particular portion or region of an image. For example, the image processing system may generate bounding shape 106 (in FIGS. 1-2) surrounding the identified salient portion (e.g., the bride depicted in image 102) using any suitable technique (e.g., a minimum enclosing circle algorithm 208). In some embodiments, bounding shape 106 may be referred to as a saliency map (e.g., a circle or other shape), and bounding shape 110 may be referred to as a co-saliency map (e.g., a circle or other shape). In some embodiments, other portions of the image may be excluded from bounding shape 106. In some embodiments, the image processing system may generate bounding shape 106 as a bounding circle encircling a region of the image foreground and/or background. In some embodiments, bounding shape 106 may correspond to a region of interest (ROI), and automated radial blurring may be performed based at least in part on such ROI.

In some embodiments, $I=\{I_1, I_2, \ldots, I_n\}$ may denote a set of n images, and radial blurring of all n images may be performed while protecting their foreground, e.g., using a mask. In some embodiments, in the automated radial blurring system provided herein, the image processing system may be configured to receive as input the set of image I, and may be configured to output zoom-blurred and spin-blurred images J and K, respectively, where $J=\{J_1, J_2, \ldots, J_n\}$ and $K=\{K_1, K_2, \ldots, K_n\}$. In some embodiments, $S=\{S_1, S_2, \ldots, S_n\}$ may denote a set of corresponding saliency parameters or saliency cues of images in I. In some embodiments, in determining the saliency parameters, images may be processed individually, without interaction or reference to other images in the plurality of images, e.g., each related to a particular category, topic, subject matter or event. In some embodiments, the image processing system may employ any suitable technique to generate a bounding shape based on the saliency parameters.

In some embodiments, in addition to saliency parameters, the image processing system may determine (at 108 of FIGS. 1-2) co-saliency parameters based on the plurality of accessed images 202. It may be useful to consider co-saliency parameters in combination with saliency parameters for one or more reasons. As an example, in certain circumstances, saliency maps may be sensitive to background saliency, and in at least some circumstances co-saliency may be more robust than saliency, e.g., in relation to identifying overlapping attributes across multiple images. In some embodiments, the saliency and co-saliency parameters may be determined in any suitable order (e.g., the saliency parameters of at least one image may be determined prior to the co-saliency parameters, or the co-saliency images for a plurality of images may be determined prior to the saliency parameters) In some embodiments, the saliency parameters and the co-saliency parameters may be determined or computed by the image processing system in parallel (e.g., as permitted by hardware and/or software resources of one or more computing devices implementing the image processing system described herein).

For example, the image processing system may generate a plurality of co-saliency maps 206 respectively corresponding to each of the plurality of images 202. The co-saliency maps 206 may be generated based on the common attributes (e.g., depiction of horses) as between the plurality of images 202. For example, portions of the plurality of images 202 that do not correspond to a depiction of a horse (such as a bride, which is present only in image 102) may be masked out of the co-saliency maps 206, and pixels determined to correspond to depictions of horses may be identified and set to a particular pixel value (e.g., 255, representing the color white).

In some embodiments, any suitable technique may be used to determine candidates for the plurality of images, e.g., one or more machine learning models, such as, for example, k-means unsupervised clustering algorithms, can be applied on image-level features to create such group or collection comprising the plurality of images. For example, each of the plurality of images may be determined to relate to a same category, topic, subject matter or event (e.g., a wedding weekend, a sports game, a party or any other suitable event). The image processing system may automatically identify such plurality of images and determine one or more co-saliency maps 206 and/or co-saliency parameters based on similarities of attributes as between the images 202 and/or how the images 202 overlap or interact with each other. Any suitable co-saliency extraction algorithm may be used to determine co-saliency parameters based on the plurality of images. In some embodiments, similar techniques used to identify salient portions of image 102 may be employed to identify common objects or portions of other images in the plurality of images 202 in relation to image 102 (and/or in relation to any other suitable image in the plurality of images 202). In some embodiments, attributes of the images determined based on such techniques may be compared to determine similarities and overlap between at least a subset of the plurality of images 202.

In some embodiments, C={$C_1$, $C_2$, . . . , $C_n$} may denote the set of the corresponding co-saliency cues of images in I. In some embodiments, in determining the co-saliency parameters, the image processing system may employ one or more of the techniques discussed in Su et al. "A Unified Transformer Framework for Group-Based Segmentation: Co-segmentation, Co-saliency Detection and Video Salient Object Detection," Journal of Latex Class Files, Vol. 14, No. 8, March 2022, CoRR abs/2203.04708 (2022), the contents of which are hereby incorporated by reference herein in their entirety.

In the example of FIG. 1, the image processing system may generate, using the techniques described herein and based at least in part on identifying one or more co-salient portions and/or co-saliency parameters associated with the plurality of images 202, a co-saliency map (at 108 of FIGS. 1-2) for image 102. For example, co-saliency map 108 may be obtained, and a technique (e.g., Otsu's method or any other suitable technique) may be applied to co-saliency map 108 to generate (at 107) a binary mask, e.g., to classify pixels of the image as belonging to a foreground region or a background region. In some embodiments, to perform such processing, a color RGB image may be converted to a grayscale image, and thresholding or segmentation may be applied to the grayscale image to generate the binary mask.

In some embodiments, the co-saliency parameters may indicate that at least a portion of a horse (and optionally a similar portion or viewpoint of a horse) is present in each of the plurality of images, or at least a threshold number of the plurality of images. In some embodiments, the image processing system may apply a mask (at 107) to image 102 to identify and set pixels corresponding to the horse to a first pixel value (e.g., 255 representing a white color), and identify and set pixels corresponding to other portions to a second pixel value (e.g., 0 representing a black color). In some embodiments, the image processing system may generate bounding shape 110 based on the co-saliency map, where bounding shape 110 surrounds the depiction of the horse from the original image, and other portions of the image may be excluded from bounding shape 110. In some embodiments, the image processing system may generate bounding shape 110 as a bounding circle encircling a region of the image foreground and/or background.

In some embodiments, the image processing system may generate bounding shape 110 surrounding the identified co-salient portion (e.g., the horse depicted in image 102) using any suitable technique (e.g., a minimum enclosing circle algorithm 208). In some embodiments, other portions of the image may be excluded from bounding shape 110. In some embodiments, the image processing system may generate bounding shape 110 as a bounding circle encircling a region of the image foreground and/or background. In some embodiments, bounding shape 110 may correspond to a region of interest (ROI), and radial blurring may be performed based at least in part on such ROI.

In some embodiments, at least a portion of one or more objects of interest, and/or portions of interest, in image 102 may be included in each of bounding shape 106 and bounding shape 110. In some embodiments, in addition or in the alternative to utilizing a bounding shape, a particular portion or object included in image 102 may be extracted based on saliency parameters and/or co-saliency parameters. In some embodiments, multiple portions or objects may be identified and/or enclosed in one or more bounding shapes based on the saliency and/or co-saliency parameters.

In some embodiments, the determined co-saliency and saliency parameters may be leveraged in combination to effectively identify one or more common and salient objects in one or more images and/or portions of one or more images. In some embodiments, the image processing system may generate (at 112), based on the saliency parameters and the co-saliency parameters, a fused map $F_i$, such as, for example, using the following equation (1):

$$F_i = \frac{\Omega(S_i)S_i + \Omega(C_i)C_i}{\Omega(S_i) + \Omega(C_i)} \quad (1)$$

where a weighted arithmetic mean of the saliency and co-saliency parameters may be computed using weights (Ωs) that represent quality scores of the parameters. In some embodiments, the quality score may correspond to an evaluation score for the saliency and co-saliency parameters, respectively, with or without reference to a ground truth value, and such quality score may be useful in ranking and weighing images or portions thereof when considering multiple sets of parameters.

For example, the fused map $F_i$ may account for both saliency $S_i$ and co-saliency $C_i$ parameters (or cues) in a united manner with appropriate weights.

In some embodiments, the image processing system may apply a mask (at 109) to image 102 to identify and set pixels corresponding to the bride and horse to a first pixel value (e.g., 255, representing a white color), and identify and set pixels corresponding to other portions to a second pixel value (e.g., 0, representing a black color). In some embodiments, once the fused map $F_i$ is obtained, the image processing system may generate a bounding shape 116 based on bounding shape 106 and bounding shape 110, e.g., by combining the entire bounding shape 106 and the entire bounding shape 110, or by combining one or more portions of bounding shape 106 and one or more portions of bounding shape 110, or by combining overlapping portions of bounding shapes 106 and 110, or any combination thereof. For example, bounding shape 116 may enclose each of the depiction of the bride (e.g., a salient object) and the depiction of the horse (e.g., a co-salient object). In some embodiments, bounding shape 116 may be a circle, or any other suitable shape. In some embodiments, bounding shape 116 (or bounding shape 106 or bounding shape 110, or any combination thereof) may correspond to a region of interest (ROI), and radial blurring may be performed based on such ROI.

In some embodiments, the image processing system may generate each of the masks applied at 105, 107 and 109 based on the image segmentation and the determined saliency and/or co-saliency parameters. Each mask may define the boundaries of a particular object, e.g., to distinguish the object from background portions of the image. For example, in order to generate such one or more masks, each pixel may be labeled as belonging to a particular type or class or sub-class of an entity (e.g., a person, an adult, a child, an animal, a particular type of object, a particular user, etc.) and/or any other suitable annotation or mechanism may be utilized (e.g., a bounding box or other bounding shape) to define a location of one or more entities in each image or frame (or across multiple images or frames) included in the plurality of images 202. In some embodiments, the mask may be a binary mask in which pixels belonging to salient portions of the image may be set to a first pixel value (e.g., a white color, corresponding to an intensity value of one, and which may correspond to a foreground) whereas the other portions may be set to a second pixel value (e.g., a black color, corresponding to an intensity value of zero, and which may correspond to a background). In some embodiments, similar techniques may be employed to generate the protection masks used for performing radial blurring. In some embodiments, the mask may comprise a vector comprising any suitable number of dimensions. For example, a vector representation of the mask may specify pixel value information and/or encode information regarding a depth of the object.

In some embodiments, the techniques described herein may be used in association with the image processing applications (e.g., video conferencing or other image-based digital environment), in the context of recording a video or capturing an image (e.g., for transmission or broadcast in real time, or at a later time, to other users, and/or to be stored at one or more devices, or in XR applications that run on smartphones or near-eye displays (e.g., AR glasses, AR head-mounted display (HMD), VR HMD or any other suitable computing device, or any combination thereof). For example, images of the real world being captured as part of a real-world environment (and/or in a field of view of the user) may be analyzed in real time or post capture to determine saliency parameters and co-saliency parameters for the one or more images, and to perform automated radial blurring based at least in part on ROIs identified on the basis of the saliency parameters and co-saliency parameters. For example, the image processing application may generate a data structure for a current field of view of the user including object identifiers associated with objects in the environment and/or indicating saliency and co-saliency parameters.

A field of view may be understood as a portion of an environment (real or virtual or any suitable combination thereof) that is captured by a camera of a user device at a given time, and/or presented to the user at a given time by the user device (e.g., an angle in a 360-degree sphere environment, or any suitable number of degrees). In some embodiments, the field of view may comprise a pair of 2D images to create a stereoscopic view in the case of a VR device; in the case of an AR device (e.g., smart glasses), the field of view may comprise 3D or 2D images, which may include a mix of real objects and virtual objects overlaid on top of the real objects using the AR device (e.g., for smart glasses, a picture captured with a camera and content added by the smart glasses). If an XR environment has a single degree of liberty, e.g., a rotation of 360 degrees, any field of view may be defined by either the edge angular coordinates (e.g., +135 degrees, +225 degrees) or by a single angular coordinate (e.g., −55 degrees) combined with the known angular opening of the field of view. If an XR environment has six degrees of liberty, say three rotations of 360 degrees and three spatial positions, any field of view may be defined by three angular coordinates and three spatial coordinates. A field of view may therefore be understood as a portion of an environment displayed when the user is at a particular location in the environment and has oriented the display or display device in a particular direction.

Figure 3:
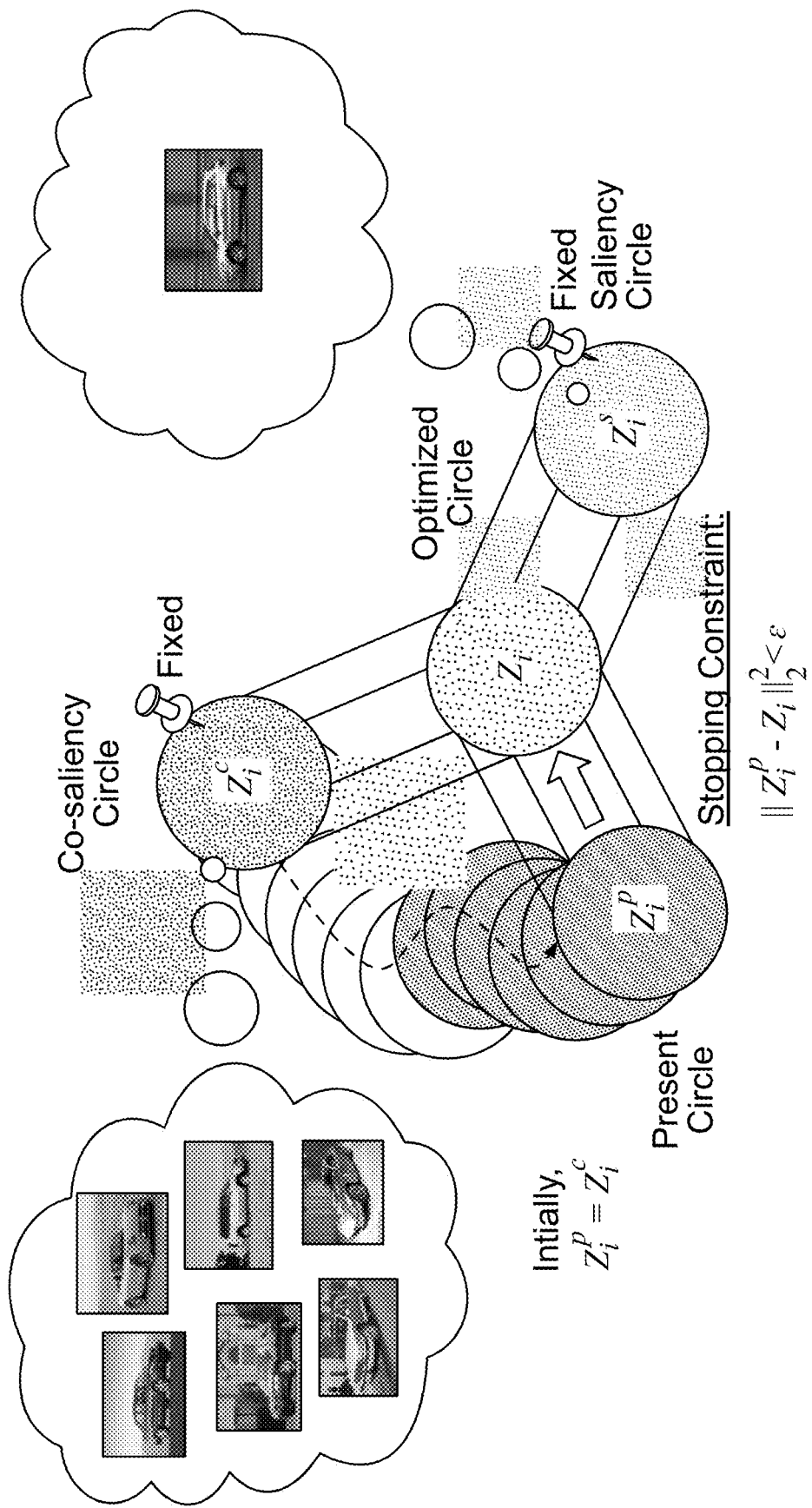
FIG. 3 shows an illustrative technique for generating an optimal bounding shape, in accordance with some embodiments of this disclosure.

FIG. 3 shows an illustrative technique for generating an optimal bounding shape, in accordance with some embodiments of this disclosure. In some embodiments, the image processing system may define an objective function to optimize the saliency and co-saliency parameters (or cues). For example, the image processing may, to find an optimal circle as the bounding shape, perform a process to determine at least the following unknown attributes: the optimal circle's center's x-coordinate $x_i$ (or blur center's x-coordinate); the optimal circle's center's y-coordinate $y_i$ (or blur center's y-coordinate) and the optimal circle's radius $r_i$ (or radius of the region to be protected). Such attributes may be combined into a column vector $z_i=[x_i, y_i, r_i]^t$ for any image $I_1$ to represent the optimal circle. In some embodiments, the unknown attributes being sought may vary based on a desired shape of a particular bounding shape. In some embodiments, $z^s_i=[x^s_i, y^s_i, r^s_i]^t$ and $z^c_i=[x^c_i, y^c_i, r^c_i]^t$ may denote the fixed saliency and co-saliency bounding circles, respectively (or fixed bounding shapes 106 and 110, respectively of FIGS. 1-2). The super-scripts 's' and 'c' indicate whether they are derived from the saliency parameter or cue $S_i$ or the co-saliency parameter or cue $C_i$. Thus, the image processing system may determine the optimized circle $z_i$ based at least in part on $z^s_i$ and $z^c_i$ obtained from the available parameters (or cues).

In some embodiments, to find $z_i$, an iterative approach may be employed, where $z_i$ is optimized in every iteration while also taking into account its present state. For example, an assumption may be made that the $z_i$ to be obtained is somewhat similar to the present $z_i$. In some embodiments, the present $z_i$ may be denoted by $z^p_i$ (e.g., a dynamically changing circle) and initially, it may be assumed that $z^p_i = z^c_i$ as a starting point for the optimal circle or optimal shape to be determined, e.g., $z^p_i$ may be initialized as the co-saliency circle or bounding shape itself. In some embodiments, in the iteration, the objective is to find $z_i$ that leverages each of $z^s_i$ and $z^c_i$ (fixed saliency-based and co-saliency-based circles or other bounding shapes) while ensuring similarity with $z^p_i$ until convergence. $z^p_i$ may be associated with a smoothness constraint, and may be updated iteratively with the optimized circle or optimized shape after each iteration.

Figure 6:
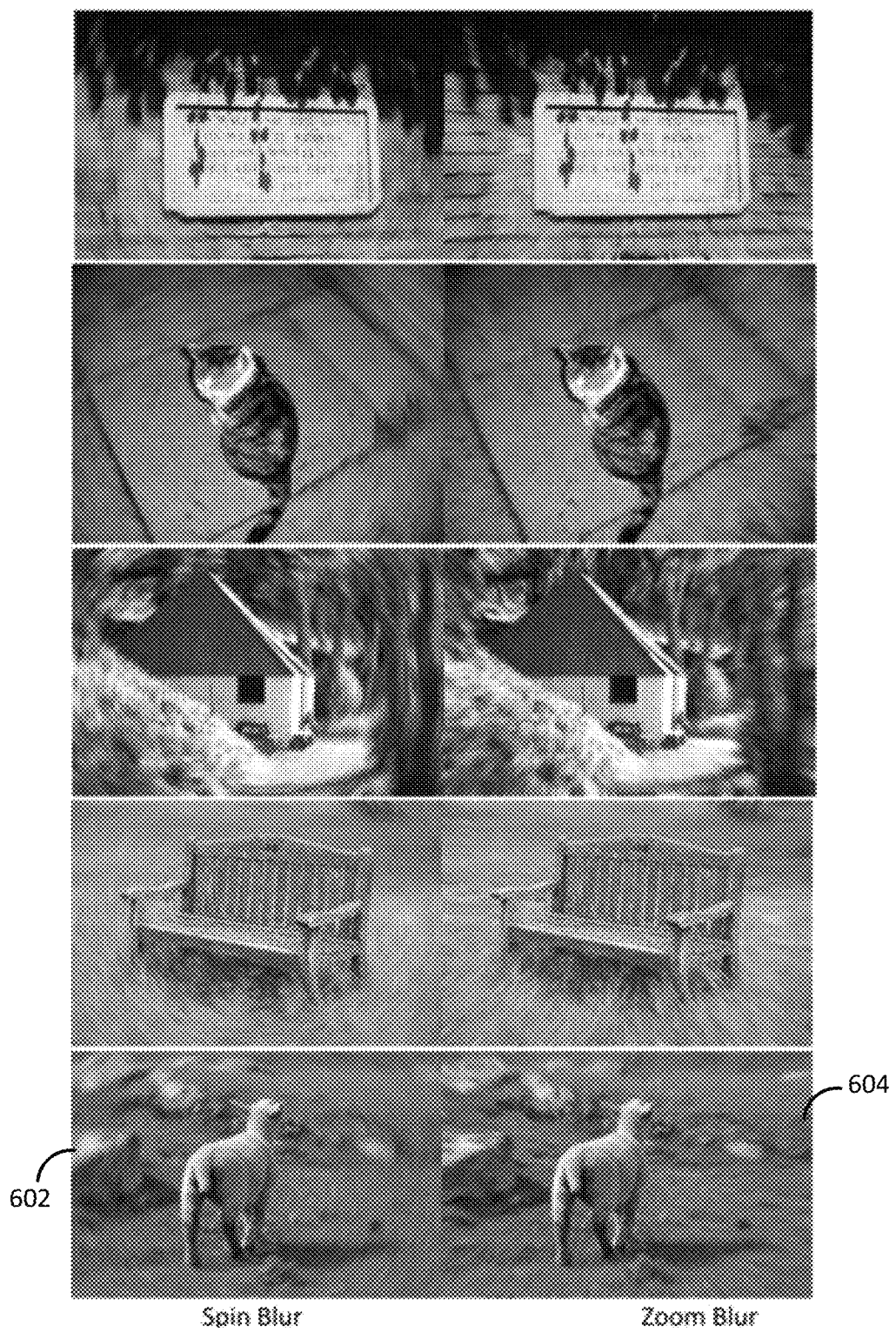
FIG. 6 shows results of performing radial blurring with a silhouetted protection mask, in accordance with some embodiments of this disclosure.

As shown in FIG. 6, such techniques may optimize $z^c_i$ given the three circles $z^s_i$, $z^c_i$ and $z^p_i$. The iterations may be stopped when $z_i$ converges:

$$\|z_i - z_i^p\|_2^2 < \epsilon.$$

which may be termed object co-circlization. In some embodiments, the objective of the optimization that is carried out at any iteration may include finding a $z_i$ leveraging co-saliency ($z^c_i$) and saliency ($z^s_i$) while taking into account a smoothness constraint induced by $z^p_i$. For this purpose, an optimization function may be devised comprising a data term and a smoothness term. As shown below in equation (2), the data term (first) term may punish selections of $z_i$ that do not encircle common, salient objects by comparing $z^c_i$ against $z^s_i$ through a cost matrix Di, and the smoothness (second) term encourages $z_i$'s similarity with its current state $z^p_i$.

$$\min_{z_i} \begin{pmatrix} z_i - z_i^c \\ z_i - z_i^s \end{pmatrix}^t D_i \begin{pmatrix} z_i - z_i^c \\ z_i - z_i^s \end{pmatrix} + \lambda \|z_i - z_i^p\|_2^2 \quad (2)$$

$$\text{s.t. } 0 <= r_i <= d_i,$$
$$\min(\mathcal{E}_i^x) <= x_i <= \max(\mathcal{E}_i^x),$$
$$\min(\mathcal{E}_i^y) <= y_i <= \max(\mathcal{E}_i^y),$$

which also shows other constraints on $z_i$: (1) the radius $r_i$ can vary between 0 to diagonal length (denoted by $d_i$) of image $I_i$; (2) the center's x-coordinate $x_i$ can lie between the minimum and maximum of $\mathcal{E}_x$, the set of row-numbers of edge pixels in image $I_i$; and (3) the center's y-coordinate $y_i$ can lie between the minimum and maximum of $\mathcal{E}_y$, the set of column-numbers of edge pixels in image $I_i$. Such constraints may define the ranges of the constituent variables present in $z_i$. In some embodiments, a parameter denoted by $\lambda$ acts as a balancing parameter between the data and the smoothness terms.

In some embodiments, to determine the optimal circle or optimal bounding shape that leverages both saliency and co-saliency maps, the optimization may be guided by costs determined by the fused map $F_i$ which signifies their union, accounting for both saliency $S_i$ and co-saliency $C_i$ in a united manner with appropriate weights. In some embodiments, $z^f_i = [x^f_i, y^f_i, r^f_i]^t$ may be a circle (or other bounding shape) that encircles only those foreground regions of $F_i$ that have an overlap with the $z^p_i$. As $z^p_i$ changes with every iteration, $z^f_i$ also may change. Such limiting of $z^f_i$ may ensure that only relevant regions play a role in the cost computation.

During matrix multiplications involved in data term computation, the costs may act as coefficients of comparisons of constituents of $z_i$ with the constituents of $z^c_i$ and $z^s_i$. These costs may punish deviations from enclosing common, salient objects, which should be better enclosed by $z^f_i$, as it's derived from the union of co-saliency and saliency maps. Thus, these costs may be modeled using comparisons between constituents of $z^f_i$ and constituents of $z^c_i$ and $z^s_i$ and arranged into the following cost-matrix Di in such a way that they become the required coefficients:

$$D_i = -\log \begin{pmatrix} \frac{|x_i^f - x_i^c|}{w_i f_i^c} & 1 & 1 & 1 & 1 & 1 \\ 1 & \frac{|y_i^f - y_i^c|}{h_i f_i^c} & 1 & 1 & 1 & 1 \\ 1 & 1 & \frac{|r_i^f - r_i^c|}{d_i f_i^c} & 1 & 1 & 1 \\ 1 & 1 & 1 & \frac{|x_i^f - x_i^s|}{w_i f_i^s} & 1 & 1 \\ 1 & 1 & 1 & 1 & \frac{|y_i^f - y_i^s|}{h_i f_i^s} & 1 \\ 1 & 1 & 1 & 1 & 1 & \frac{|r_i^f - r_i^s|}{d_i f_i^s} \end{pmatrix} \quad (3)$$

which may eventually become a diagonal matrix and thus facilitate one-to-one comparisons of constituents of $z_i$ with the constituents of $z^c_i$ and $z^s_i$, in order to compute the data term. In some embodiments, $f^c_i$ and $f^s_i$ represent an average of fused map ($F_i$) values inside the circles $z^c_i$ and $z^s_i$, respectively. Their incorporation may punish deviations from enclosing high-value regions of $F_i$.

Figure 4:
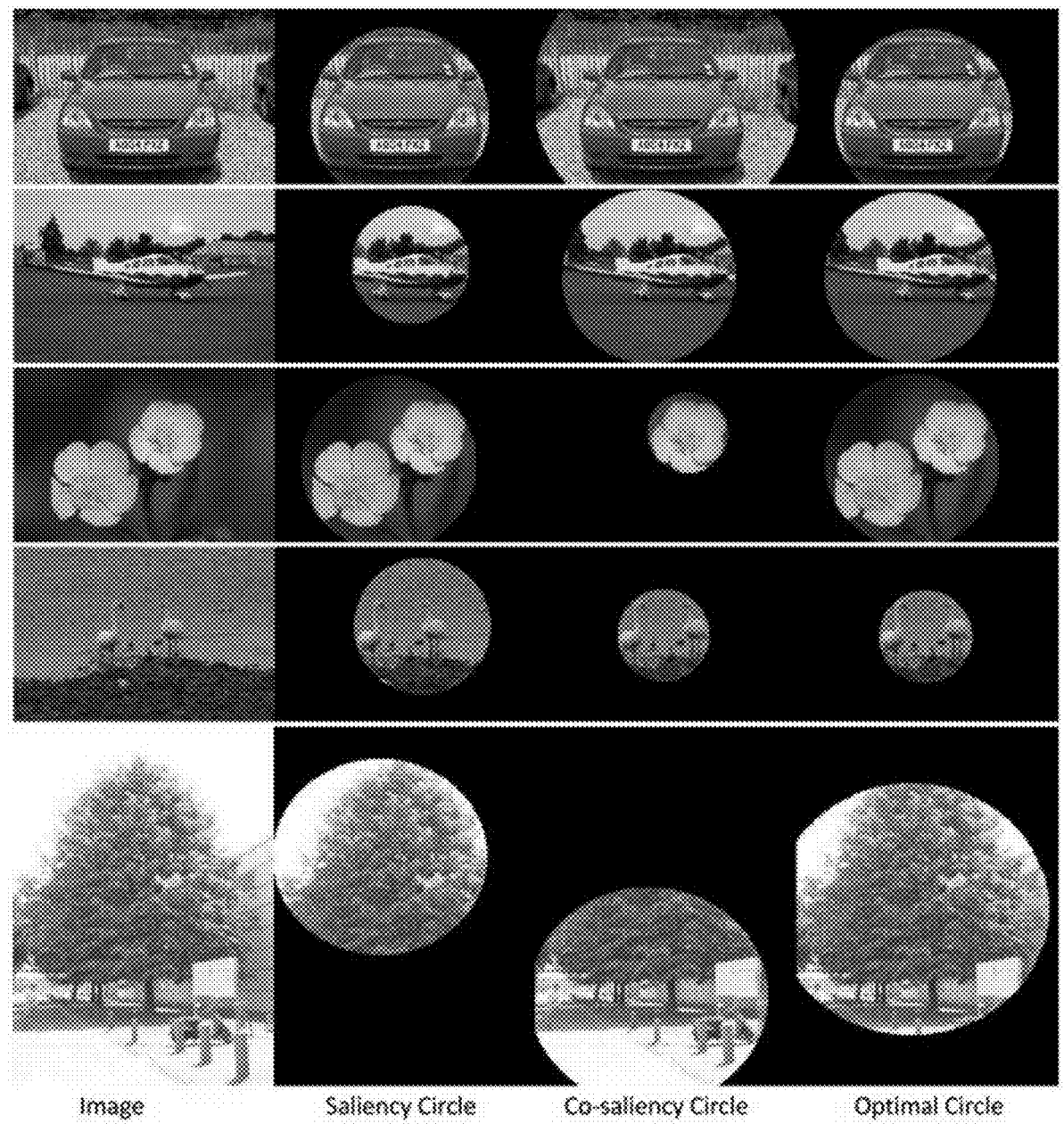
FIG. 4 shows a comparison of optimal circles with respective saliency and co-saliency maps used in the optimization process, in accordance with some embodiments of this disclosure.

FIG. 4 shows a comparison of optimal circles with respective saliency and co-saliency circles used in the optimization process, in accordance with some embodiments of this disclosure. The effectiveness of the method is demonstrated in comparison to the leveraged saliency and co-saliency parameters (or cues). For example, even if one of these parameters (or cues) does not encircle or enclose the relevant object or portion of the image appropriately, the proposed framework may ensure that the foreground objects are encircled or enclosed correctly.

In some embodiments, the techniques described herein may be used in connection with one or more videos. For example, in the case of a video V, apart from saliency and co-saliency parameters (or cues), the image processing system may leverage motion saliency parameters (or cues), which measure uniqueness in terms of motion. In the case of a video, the image processing system may compute co-saliency parameters (or cues) using frames or portions of a single video or frames or portions from a plurality of videos, e.g., in a video collection. In some embodiments, it may be desirable to ensure that similar circles (or other bounding shapes) are selected in subsequent or consecutive frames, which may be referred to as a spatiotemporal smoothness constraint. Thus, the objective function (e.g., discussed above in connection with an optimal circle or optimal bounding shape), in relation to one or more videos, can be updated as follows:

$$\min \sum_{I_i \in V} \begin{pmatrix} z_i - z_i^c \\ z_i - z_i^s \\ z_i - z_i^m \end{pmatrix}^t D_i \begin{pmatrix} z_i - z_i^c \\ z_i - z_i^s \\ z_i - z_i^m \end{pmatrix} + \lambda \begin{pmatrix} z_i - z_{i-1}^p \\ z_i - z_i^p \\ z_i - z_{i+1}^p \end{pmatrix}^t \begin{pmatrix} z_i - z_{i-1}^p \\ z_i - z_i^p \\ z_i - z_{i+1}^p \end{pmatrix} \quad (4)$$

$$\text{s.t. } 0 <= r_i <= \sqrt{w_i^2 + h_i^2} \ \forall I_i \in V,$$

$$\min(\mathcal{E}_i^x) <= x_i <= \max(\mathcal{E}_i^x) \ \forall I_i \in V,$$

$$\min(\mathcal{E}_i^x) <= y_i <= \max(\mathcal{E}_i^x) \ \forall I_i \in V,$$

where motion saliency may be incorporated in the data term and a spatiotemporal smoothness constraint may be added to the smoothness term. $z^f_m = [x^m_i, y^m_i, r^m_i]^t$ denotes the bounding circle for foreground regions of the motion saliency cue Mi. Note that the optimization function may consider all the video frames together, rather than just a single frame. The stopping constraint may correspond to $$\sum_{I_i \in V} \|z_i - z_i^p\|_2^2 < \epsilon \times |V|,$$

where |V| is the number of frames in the video V. Note that subscripts (i−1) and (i+1) indicate previous and next frames. The cost matrix $D_i$ may be updated as follows:

$$D_i = -\log \begin{pmatrix} \frac{|x_i^f - x_i^c|}{w_i f_i^c} & 1 & 1 & 1 & 1 & 1 & 1 & 1 & 1 \\ 1 & \frac{|y_i^f - y_i^c|}{h_i f_i^c} & 1 & 1 & 1 & 1 & 1 & 1 & 1 \\ 1 & 1 & \frac{|r_i^f - r_i^c|}{d_i f_i^c} & 1 & 1 & 1 & 1 & 1 & 1 \\ 1 & 1 & 1 & \frac{|x_i^f - x_i^s|}{w_i f_i^s} & 1 & 1 & 1 & 1 & 1 \\ 1 & 1 & 1 & 1 & \frac{|y_i^f - y_i^s|}{h_i f_i^s} & 1 & 1 & 1 & 1 \\ 1 & 1 & 1 & 1 & 1 & \frac{|r_i^f - r_i^s|}{d_i f_i^s} & 1 & 1 & 1 \\ 1 & 1 & 1 & 1 & 1 & 1 & \frac{|x_i^f - x_i^m|}{w_i f_i^m} & 1 & 1 \\ 1 & 1 & 1 & 1 & 1 & 1 & 1 & \frac{|y_i^f - y_i^m|}{h_i f_i^m} & 1 \\ 1 & 1 & 1 & 1 & 1 & 1 & 1 & 1 & \frac{|r_i^f - r_i^m|}{d_i f_i^m} \end{pmatrix}$$

where $z_i^f = [x_i^f, y_i^f, r_i^f]^t$ is the bounding circle for foreground regions of an updated $F_i$ that overlap with $z_i^p$. $F_i$ gets updated as follows:

$$F_i = \frac{\Omega(S_i)S_i + \Omega(C_i)C_i + \Omega(M_i)M_i}{\Omega(S_i) + \Omega(C_i) + \Omega(M_i)} \quad (5)$$

which is a weighted mean of the available parameters (or cues). Such modifications in the framework described herein may ensure that automated radial blurring can be successfully applied to videos.

In some embodiments, the image processing system may take into account motion by comparing image frames of video to reveal motion over a period of time, e.g., if the video is captured in 30 frames per second, each of the 30 frames may be analyzed to determine if there is motion in each or any of the frames. In some embodiments, motion vectors may be generated that describe an amount of motion with respect to consecutive frames of the video.

In some embodiments, the equation (4) can be converted into a quadratic programming problem with linear constraints. Such a problem can be solved using any suitable technique and/or computing platform (e.g., the quadprog( ) function available in Matlab®). In a non-limiting example, a value of $\iota$ (which may be used in computing the stopping constraint) may be set to 3, and a value of λ (a trade-off parameter) may be set to 1, and a maximum number of iterations may be set to 32.

In some embodiments, the image processing system may be configured to perform automated radial blurring based at least in part on the processing steps described herein. For example, the image processing system may be configured to perform zoom blur, which provides the effect of a zooming camera, and/or spin blur, which provides the effect of rotating camera. In some embodiments, zoom blur may be performed by averaging slightly differently resized images of an image, and the spin blur may be performed by averaging slightly differently rotated images of an image. While performing zoom blur and spin blur are described, the techniques described herein may be used to perform any suitable radial blurring effect.

The image processing system may be configured to compute zoom-blurred image $J_i$ and spin-blurred image $K_i$ of image $I_i$ based at least in part on the techniques described herein. In some embodiments, the image processing system may employ one or more protection masks (denoted as $\alpha_i$) as part of performing radial blurring of one or more images. In some embodiments, the protection mask may be configured to be soft to ensure a smooth transition between protected and blurred regions. In some embodiments, the protection mask can be a circular protection mask or a silhouetted protection mask. In some embodiments, the image processing system may be configured to perform radial blurring on all portions of the image (or a majority of the image) other than the portions associated with or specified by the protection mask To generate the circular mask, sigmoid and Gaussian masks may be generated and parameterized by $z_i$ and their element-wise geometric mean may be determined. While the sigmoid function ensures that protected and blurred regions may be set to values close to 1 and 0, respectively, the gaussian mask ensures a smoother transition between the two. Thus, the value of $\alpha_i$ at any pixel (x, y) may be given by:

$$\alpha_i(x, y|z_i) = \sqrt{\gamma(x, y|z_i)\sigma(x, y|z_i)} \tag{6}$$

where $\gamma$ and $\sigma$ are gaussian and sigmoid functions, respectively, as detailed below:

$$\gamma(x, y|z_i) = \frac{1}{\pi r_i^2} \exp\left(-\frac{(x-x_i)^2 + (y-y_i)^2}{r_i^2}\right) \tag{7}$$

$$\sigma(x, y|z_i) = \frac{1}{\left(1 + \exp\left(\sqrt{(x-x_i)^2 + (y-y_i)^2} - r_i\right)\right)} \tag{8}$$

Figure 5:
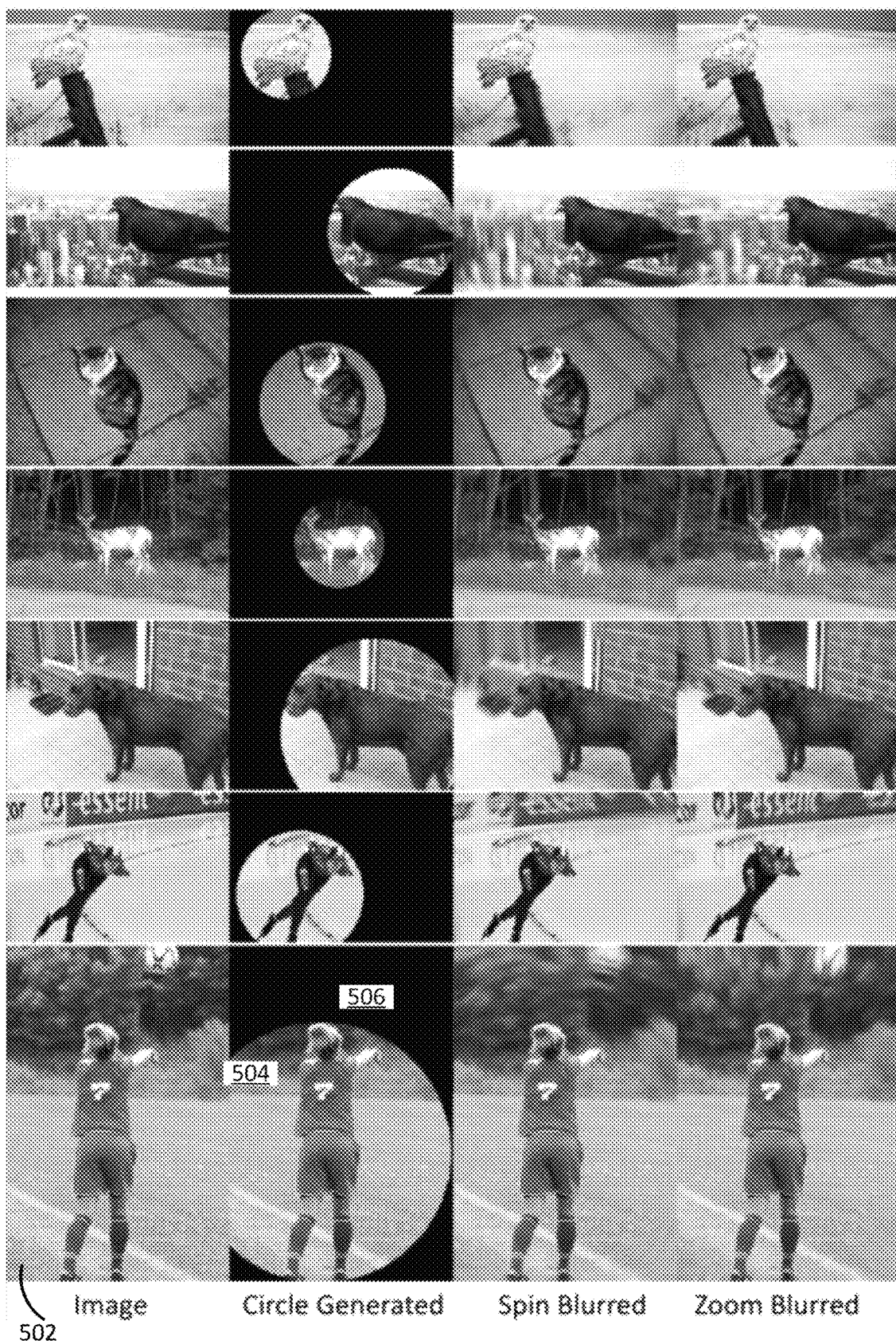
FIG. 5 shows results of performing radial blurring with a circular protection mask, in accordance with some embodiments of this disclosure.

FIG. 5 shows results of performing radial blurring with a circular protection mask, in accordance with some embodiments of this disclosure. In FIG. 5, results of radial blurring, along with circles generated by techniques described herein, are shown. For example, unlike the blurred region outside the circular protection mask, hardly any blur in the protected region associated with the circular protection mask is noticeable. As shown in FIG. 5, for image 502, the circular protection mask protects even background regions (e.g., at 504, the grass and trees) inside the circle, in addition to the foreground (e.g., the soccer player on the soccer field), while region 506 is excluded from the protection mask and is subjected to automated radial blurring. Alternatively, the image processing system may employ a silhouetted protection mask, e.g., if only the foreground regions inside the circle are desired to be protected from the radial blurring effect. In some embodiments, the protection mask may be updated by multiplying the fused map with the sigmoid, as shown below:

$$\alpha_i(x, y|z_i) = \sqrt{\gamma(x, y|z_i)\sigma(x, y|z_i)F_i(x, y)} \tag{9}$$

through which it may be ensured that only one or more salient regions (as per the fused map) inside the circle are protected. In some embodiments, if $z^s$ is used, $S_i$ may be used, and if $z^c$ is used, $C_i$ may be used.

FIG. 6 shows results of performing radial blurring with a silhouetted protection mask, in accordance with some embodiments of this disclosure. Such salient region-based protection for the purpose of automated radial blurring may consider salient regions (as ascertained by the map used) as well as soft segmentation. For example, in images 602 and 604 (corresponding to a spin blur effect and a zoom blur effect, respectively) where a silhouetted protection mask is employed, regions (e.g., depicting grass) immediately surrounding the object of interest (e.g., the animal) may be subjected to radial blurring, e.g., only the object of interest may be protected from the radial blurring.

In some embodiments, the image processing system may be configured to perform radial blurring to one or more images based on the bounding shape (e.g., bounding shape 106, 110 and/or 116 of FIGS. 1 and/or 2) and the protection mask (e.g., the circular protection mask or the silhouetted protection mask). Such radial blurring may utilize the determined saliency parameters (or cues), the determined co-saliency parameters (or cues), or any combination thereof, to generate output image(s) with radial blur in an automated manner. In some embodiments, the fused map (e.g., corresponding to or used to generate fused bounding shape 116) may be used as the protection mask.

Illustrative equations for computing such output images are given below:

$$J_i = \alpha_i \cdot I_i + (1 - \alpha_i) \cdot \mathbb{T}\left(\frac{1}{|U|}\sum_{u \in U} \mathbb{S}(\mathbb{T}(I_i, (-x_i, -y_i)), u), (x_i, y_i)\right) \tag{10}$$

$$K_i = \alpha_i \cdot I_i + (1 - \alpha_i) \cdot \mathbb{T}\left(\frac{1}{|V|}\sum_{v \in V} \mathbb{R}(\mathbb{T}(I_i, (-x_i, -y_i)), v), (x_i, y_i)\right) \tag{11}$$

where the image processing system may, in performing the automated radial blurring, fuse or blend an initial blurred image and another version of the image using a protection mask $\alpha_i$. In some embodiments, "." denotes element-wise multiplication. To generate the initial blurred image, the image may be translated (denoted by (T)) by $(-x_i, -y_i)$, to ensure that the radial blur is at the origin of an image coordinate system. In the case of zoom blur, scaling may then be performed using different scaling factors in T={0.95, . . . , 1}) and their average may be taken, the result of which may then be translated by $(-x_i, -y_i)$ to get back to original image coordinates. In spin blur, the same or similar steps may be followed except that the image may be rotated instead of performing scaling, using different angles in V={−2°, . . . , 2°}. In some embodiments, the image processing system may be configured to perform automated radial blurring on any suitable number of images and/or videos (e.g., the plurality of images 202 of FIG. 2), e.g., by blending a blurred image and another version of the image using a protection mask. In some embodiments, blending a blurred image and another version of the image using a protection mask may comprise blending two different versions of the image having different blurring parameters. In some embodiments, one of the versions of the image may be an original version of the image.

In some embodiments, when performing automated radial blurring of one or more images, the image processing system may take into account a ratio of bounding shape 106 and/or bounding shape 110 and/or bounding shape 116 to the remainder of the image (e.g., portions of the image outside the one or more bounding shapes). For example, such ratio may be compared to a threshold to determine whether the bounding shapes do not occupy too much of an image, which might detract from the radial blurring effect if regions inside the bounding shapes are not subjected to the radial blurring effect. For example, in this circumstance, the image processing system might reduce the size of one or more of the bounding shapes, or request user input to clarify a location and/or size of the one or more bounding shapes.

Figure 7A:
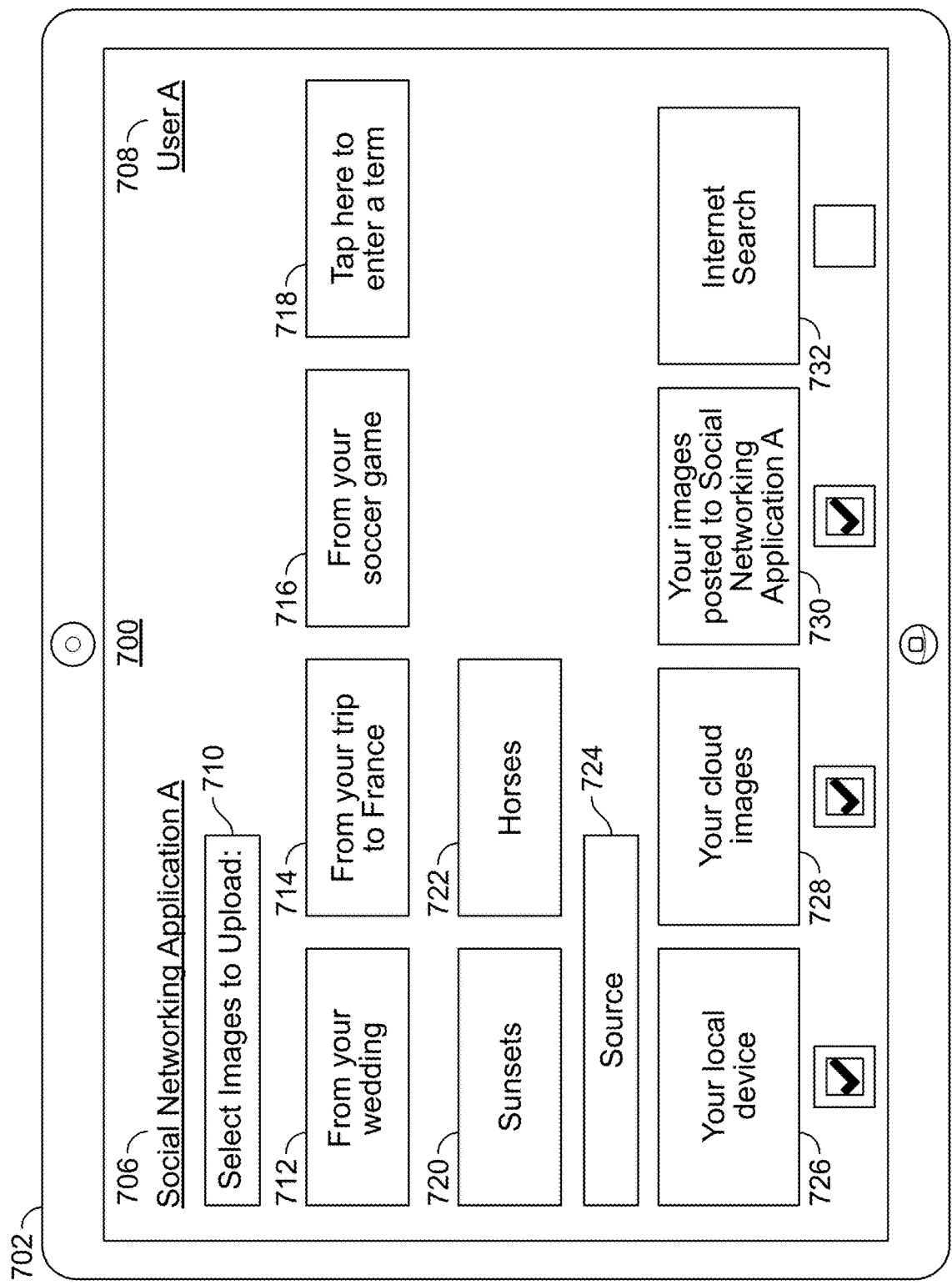
FIGS. 7A-7B show illustrative user interfaces, in accordance with some embodiments of this disclosure.
Figure 7B:
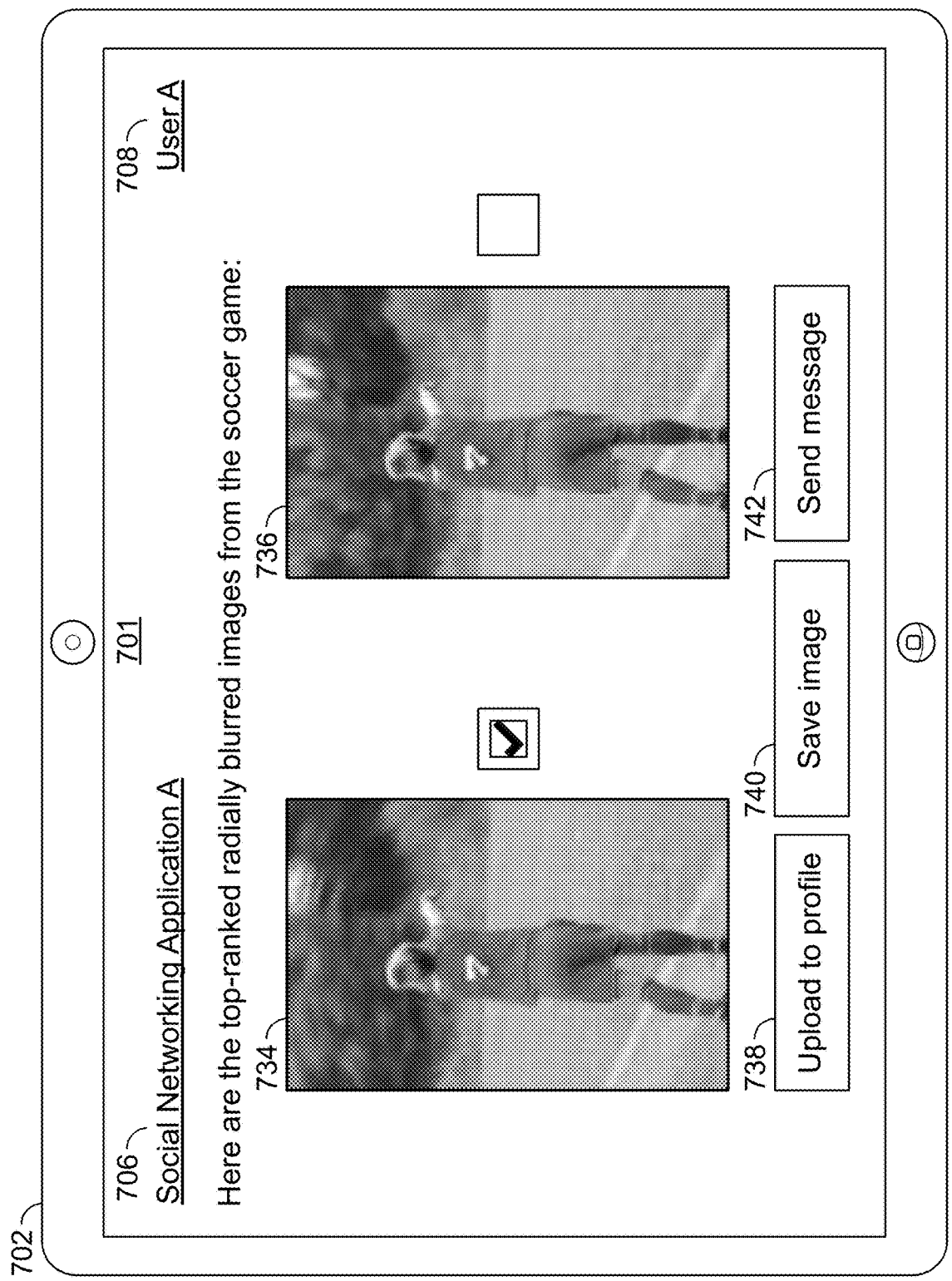

FIGS. 7A-7B show illustrative user interfaces, in accordance with some embodiments of this disclosure. The image processing application may correspond to, include, or be incorporated into "Social Networking Application A" indicated at 706, which may provide user interface 700 at device 702. While user interface is described as being provided by "Social Networking Application A" indicated at 706, any suitable website, application (e.g., an image storage or image management or image editing application, or any combination thereof) or operating system may provide such user interface. In some embodiments, device 702 may be a same or different device than a device having captured a plurality of images (e.g., images 202 of FIG. 2). User interface 700 may be provided to a user profile indicated at 708 ("User A"), and such user may have an account with the application indicated at 706. Inputs can be received at the user interfaces of FIGS. 7A-7B in any suitable form (e.g., tactile or touch input, a mouse click, selection of a UI or hardware button or option, voice input, biometric input, or any other suitable input, or any combination thereof). In some embodiments, the application indicated at 706 may be an advertising agency, e.g., operating a social networking account or operating another digital platform, and desiring to utilize radially blurred imagery in advertising their products or services.

At 710, user interface 700 may provide various options such as, for example, options 712, 714, 716, 718, 720 and 722. For example, upon receiving selection of option 712, the image processing application may automatically perform radial blurring (in accordance with the techniques described herein) on a plurality of images from a particular image collection corresponding to User A's wedding, and/or may output one or more of such radially blurred images for selection by the user. In some embodiments, such one or more radially blurred images of User A's wedding may be automatically recommended and output to User A without receiving explicit user input, e.g., may be provided as a recommendation on a home screen of the application indicated at 706, or may be provided in association with a notification or other electronic message to User A indicated at 708. In some embodiments, a list of candidates best suited for radial blurring may be generated automatically (e.g., recommended by an algorithm) or may be based on user input (e.g., a received user search for images that meet at least one criterion such as, for example, "me and my dog"). In some embodiments, saliency and co-saliency parameters for each candidate image may be determined (and/or radial blurring may be performed) by the image processing system prior to receiving such user input. Alternatively, saliency and co-saliency parameters for each candidate image may be determined (and/or radial blurring may be performed) by the image processing system in response to (or after) receiving such user input. For example, the control circuitry may wait until a user specifies one or more particular images prior to determining saliency and co-saliency parameters (and/or prior to performing radial blurring) in relation to such one or more particular images.

In some embodiments, the image processing application may enable User A indicated at 708 to specify one or more sources from which the user's wedding photos should be retrieved. For example, user interface 700 may include option 726 corresponding to images on the user's local device 702; option 728 corresponding to images stored on one or more cloud platforms associated with the user indicated at 708; option 730 corresponding to images previously posted to or otherwise associated with the user's profile (and/or other users' profiles, such as, for example, friends of User A) on the application indicated at 706; and option 732 corresponding to performing an Internet search associated with the User A's wedding or weddings generally.

In some embodiments, the image processing application may determine the plurality of images using any suitable technique, e.g., from User A's wedding (option 712); from User A's trip to France (option 714); from User A's soccer game (option 716); associated with a user-specified term or terms (option 718); associated with the term "sunsets" (option 720); or associated with the term "horses" (option 722). For example, the image processing application may reference (or generate) metadata associated with one or more images, e.g., location-based metadata, time-based metadata, descriptors of an image or other tags for the image, the image's inclusion in a particular album, or any other suitable metadata, or any combination thereof. For example, metadata may be generated by detecting similar objects in images and/or determining other commonalities amongst various images, e.g., being related to a particular event. In some embodiments, in response to receiving input of at least one criterion (e.g., selection of option 712), the image processing application may compare such at least one criterion to the metadata of one or more collections of images, and upon determining that the metadata corresponds to the at least one received criterion, generate for display options (e.g., at FIG. 7B) to enable selection of one or more of the radially blurred plurality of images.

As shown in FIG. 7B, user interface 701 may be provided by the image processing application, such as, for example, in response to receiving selection of option 716 corresponding to "From your soccer game." At user interface 701, the image processing application may be configured to rank a plurality of images related to User A's soccer game, and generate for display one or more of the radially blurred plurality of images (e.g., images 734 and 736) that are ranked highest. In some embodiments, the ranking may be based upon the determined saliency parameters and/or co-saliency parameters, to identify the best radial blurring candidates. For example, a top radially blurred candidate may be identified as an image having a largest fused bounding shape, an image having a salient and/or co-salient portion at a particular position in the image (e.g., centered), or being based on quality scores associated with the saliency and/or co-saliency parameters, or based on any other suitable criterion, or any combination thereof.

In some embodiments, user interface 701 may provide an option 738 to upload selected image 734 to User A's profile with "Social Networking Application A" indicated at 706; option 740 to save image 734 (e.g., locally at device 702 or in the cloud at a remote server); and/or option 742 to enable User A to send image 734 in a message (e.g., a text message or email or any other suitable electronic message).

In some embodiments, inputs can be received at the user interfaces of FIGS. 7A-7B in any suitable form (e.g., tactile or touch input, a mouse click, selection of a UI or hardware button or option, voice input, biometric input, or any other suitable input, or any combination thereof). For example, the image processing system may receive voice input of "I want pictures with boats and sky" and the image processing system may identify, and perform radial blurring on (in accordance with the techniques described herein), images associated with User A or otherwise retrieved from any suitable source related to the received user input.

FIGS. 8-9 show illustrative devices, systems, servers, and related hardware for performing radial blurring of at least one image, in accordance with some embodiments of this disclosure. FIG. 8 shows generalized embodiments of illustrative user devices 800 and 801, which may correspond to, e.g., user device 702 of FIG. 7. For example, user device 800 may be a smartphone device, a tablet, a near-eye display device, an XR device, or any other suitable computing device. In another example, user device 801 may be a user television equipment system or device. User television equipment device 801 may include set-top box 815. Set-top box 815 may be communicatively connected to microphone 816, Faudio output equipment (e.g., speaker or headphones 814), and display 812. In some embodiments, microphone 816 may receive audio corresponding to a voice of a video conference participant and/or ambient audio data during a video conference. In some embodiments, display 812 may be a television display or a computer display. In some embodiments, set-top box 815 may be communicatively connected to user input interface 810. In some embodiments, user input interface 810 may be a remote control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user devices are discussed below in connection with FIG. 9. In some embodiments, device 800 may comprise any suitable number of sensors (e.g., gyroscope or gyrometer, or accelerometer, etc.), and/or a GPS module (e.g., in communication with one or more servers and/or cell towers and/or satellites) to ascertain a location of device 800. In some embodiments, device 800 comprises a rechargeable battery that is configured to provide power to the components of the device.

Each one of user device 800 and user device 801 may receive content and data via input/output (I/O) path 802. I/O path 802 may provide content (e.g., broadcast programming, on-demand programming, Internet content, content available over a local area network (LAN) or wide area network (WAN), and/or other content) and data to control circuitry 804, which may comprise processing circuitry 806 and storage 808. Control circuitry 804 may be used to send and receive commands, requests, and other suitable data using I/O path 802, which may comprise I/O circuitry. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing. While set-top box 815 is shown in FIG. 3 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., device 800), an XR device, a tablet, a network-based server hosting a user-accessible client device, a non-user-owned device, any other suitable device, or any combination thereof.

Control circuitry 804 may be based on any suitable control circuitry such as processing circuitry 806. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for the image processing application stored in memory (e.g., storage 808). Specifically, control circuitry 804 may be instructed by the image processing application to perform the functions discussed above and below. In some implementations, processing or actions performed by control circuitry 804 may be based on instructions received from the image processing application.

In client/server-based embodiments, control circuitry 804 may include communications circuitry suitable for communicating with a server or other networks or servers. The image processing application may be a stand-alone application implemented on a device or a server. The image processing application may be implemented as software or a set of executable instructions. The instructions for performing any of the embodiments discussed herein of the image processing application may be encoded on non-transitory computer-readable media (e.g., a hard drive, random-access memory on a DRAM integrated circuit, read-only memory on a BLU-RAY disk, etc.). For example, in FIG. 3, the instructions may be stored in storage 808, and executed by control circuitry 804 of a device 800.

In some embodiments, the image processing application may be a client/server application where only the client application resides on device 800 (e.g., device 104), and a server application resides on an external server (e.g., server 904 and/or server 904). For example, the image processing application may be implemented partially as a client application on control circuitry 804 of device 800 and partially on server 904 as a server application running on control circuitry 911. Server 904 may be a part of a local area network with one or more of devices 800, 801 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 904 and/or an edge computing device), referred to as "the cloud." Device 800 may be a cloud client that relies on the cloud computing capabilities from server 904 to determine whether processing (e.g., at least a portion of virtual background processing and/or at least a portion of other processing tasks) should be offloaded from the mobile device, and facilitate such offloading. When executed by control circuitry of server 904, the image processing application may instruct control circuitry 911 to perform processing tasks for the client device and facilitate the automated radial blurring. The client application may instruct control circuitry 804 to determine whether processing should be offloaded. In some embodiments, the video conference may correspond to one or more of online meetings, virtual meeting rooms, video calls, Internet Protocol (IP) video calls, etc.

Control circuitry 804 may include communications circuitry suitable for communicating with a server, edge computing systems and devices, a table or database server, or other networks or servers The instructions for carrying out the above mentioned functionality may be stored on a server (which is described in more detail in connection with FIG. 9. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of user devices, or communication of user devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as the image processing application data described above. Nonvolatile memory may also be used (e.g., to launch a boot-up routine and other instructions). Cloud-based storage, described in more detail in relation to FIG. 9, may be used to supplement storage 808 or instead of storage 808.

Control circuitry 804 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 804 may also include scaler circuitry for upconverting and downconverting content into the preferred output format of user 800. Control circuitry 804 may also include digital-to-analog converter circuitry and analog-to-digital converter circuitry for converting between digital and analog signals. The tuning and encoding circuitry may be used by user device 800, 801 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is pro-vided as a separate device from user device 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user device 800 and user device 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and equipment 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words or terms or numbers that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The image processing application may be implemented using any suitable architecture. For example, it may be a stand-alone application wholly-implemented on each one of user device 800 and user device 801. In such an approach, instructions of the application may be stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to provide video conferencing functionality and generate any of the displays discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a conference participant profile. Control circuitry 804 may obtain all or part of other user profiles that are related to a particular user (e.g., via social media networks), and/or obtain information about the user from other sources that control circuitry 804 may access. As a result, a user can be provided with a unified experience across the user's different devices.

In some embodiments, the image processing application is a client/server-based application. Data for use by a thick or thin client implemented on each one of user device 800 and user device 801 may be retrieved on-demand by issuing requests to a server remote to each one of user device 800 and user device 801. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 310 and transmit those inputs to the remote server for processing and generating the corresponding displays. For example, device 800 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to device 800 for presentation to the user.

In some embodiments, the image processing application may be downloaded and interpreted or otherwise run by an interpreter or virtual machine (run by control circuitry 804). In some embodiments, the image processing application may be encoded in the ETV Binary Interchange Format (EBIF), received by control circuitry 804 as part of a suitable feed, and interpreted by a user agent running on control circuitry 804. For example, the image processing application may be an EBIF application. In some embodiments, the image processing application may be defined by a series of JAVA-based files that are received and run by a local virtual machine or other suitable middleware executed by control circuitry 804. In some of such embodiments (e.g., those employing MPEG-2, MPEG-4, HEVC or any other suitable digital media encoding schemes), the image processing application may be, for example, encoded and transmitted in an MPEG-2 object carousel with the MPEG audio and video packets of a program.

FIG. 9 is a diagram of an illustrative system 900 for enabling user controlled extended reality, in accordance with some embodiments of this disclosure. User devices 907, 908, 910 (which may correspond to, e.g., user device 800 or 801) may be coupled to communication network 909. Communication network 909 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 909) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user devices may also communicate with each other directly through an indirect path via communication network 909.

System 900 may comprise media content source 902, one or more servers 904, and/or one or more edge computing devices. In some embodiments, the image processing application may be executed at one or more of control circuitry 911 of server 904 (and/or control circuitry of user devices 907, 908, 910 and/or control circuitry of one or more edge computing devices). In some embodiments, the media content source and/or server 904 may be configured to host or otherwise facilitate video communication sessions between user devices 907, 908, 910 and/or any other suitable user devices, and/or host or otherwise be in communication (e.g., over network 909) with one or more social network services.

In some embodiments, server 904 may include control circuitry 911 and storage 914 (e.g., RAM, ROM, Hard Disk, Removable Disk, etc.). Storage 914 may store one or more databases. Server 904 may also include an input/output path 912. I/O path 912 may provide video conferencing data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911.

Figure 10:
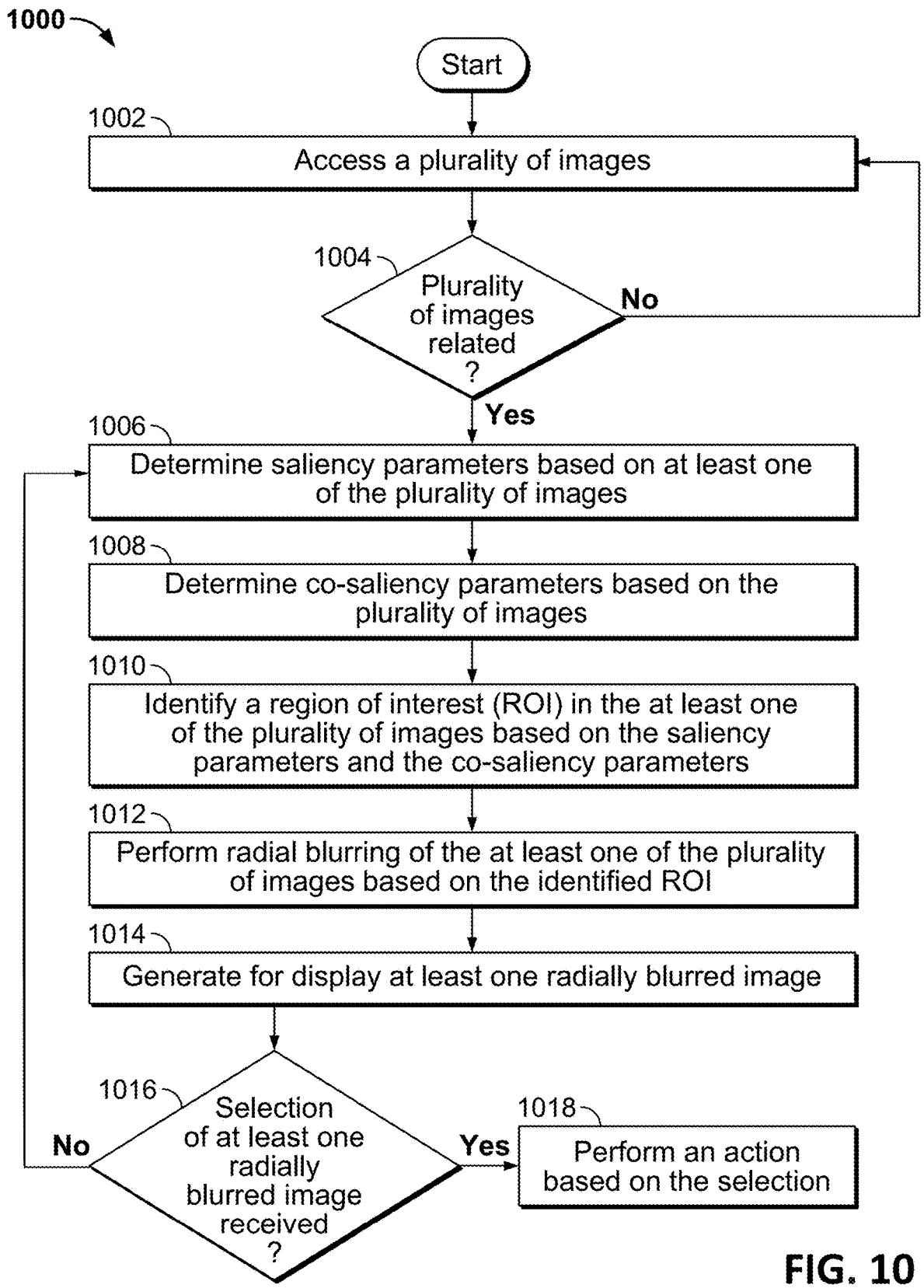
FIG. 10 is a flowchart of a detailed illustrative process for performing radial blurring of at least one image, in accordance with some embodiments of this disclosure.

FIG. 10 is a flowchart of a detailed illustrative process 1000 for performing radial blurring of at least one image, in accordance with some embodiments of this disclosure. In various embodiments, the individual steps of process 1000 may be implemented by one or more components of the devices and systems of FIGS. 1-9 and may be performed in combination with any of the other processes and aspects described herein. Although the present disclosure may describe certain steps of process 1000 (and of other processes described herein) as being implemented by certain components of the devices and systems of FIGS. 1-9, this is for purposes of illustration only, and it should be understood that other components of the devices and systems of FIGS. 1-9 may implement those steps instead.

At 1002, control circuitry (e.g., control circuitry 804 of FIG. 8 and/or control circuitry 904 of FIG. 9) may access a plurality of images (e.g., images 202 of FIG. 2). In some embodiments, the control circuitry may access the plurality of images from any suitable source, e.g., a social media application, from locally stored images (e.g., stored at device 702 of User A indicated at device 708) or remotely stored images, or from any other suitable source, or any combination thereof. In some embodiments, the control circuitry accesses the plurality of images over a network (e.g., communication network 909 of FIG. 9 or any other suitable network) stored at, for example, media content source 902 and/or server 904 of FIG. 9.

At 1004, the control circuitry may determine whether the plurality of images accessed at 1002 are sufficiently related to each other. For example, the control circuitry may automatically access and perform processing (e.g., pre-processing for performing automated radial blurring and/or radial blurring) on the plurality of images based on determining that the plurality of images are included in a collection of images relating to a particular category, topic, subject matter or event. In some embodiments, the control circuitry may determine that metadata associated with the plurality of images indicates that such images relate to the particular category, topic, subject matter or event. In some embodiments, the control circuitry may access and analyze the plurality of images automatically, e.g., without receiving explicit user input to access or analyze such images. In some embodiments, the control circuitry may determine that the plurality of images are sufficiently related based on determining such images were captured at a same or similar location and/or time. In some embodiments, the control circuitry may generate one or more similarity scores as between the images, and the determination at 1004 may be based at least in part on such one or more similarity scores.

In response to determining the plurality of images are sufficiently related, processing may proceed to 1006; otherwise processing may return to 1002 where the control circuitry may access a different plurality of images and determine whether such images are sufficiently related.

At 1006, the control circuitry may determine saliency parameters based on at least one of the plurality of images. The control circuitry may access at least one image (e.g., image 102 of FIGS. 1-2) of the plurality of images (e.g., images 202 of FIG. 2) and determine one or more salient portions of the at least one image. For example, the control circuitry system may utilize one or more machine learning models to identify the depiction of the bride in image 102 as a salient portion of image 102 and identify the coordinates and boundaries of the depiction of the bride. In some embodiments, the control circuitry may generate, based at least in part on identifying one or more salient portions and/or saliency parameters associated with at least one image, a saliency map 104. For example, as shown in FIG. 2, saliency map 104 may be obtained, and a technique (e.g., Otsu's method or any other suitable technique) may be applied to saliency map 104 to generate a binary mask, e.g., to classify pixels of the image as belonging to a foreground region or a background region. In some embodiments, the image processing system may generate a bounding shape (e.g., bounding shape 106 of FIGS. 1-2) or other bounding mechanism based at least in part on the saliency parameters, and the bounding shape may surround a perimeter of and enclose a portion of the image determined to be a salient portion of the image (e.g., the depiction of the bride).

At 1008, the control circuitry may determine co-saliency parameters based on the plurality of accessed images (e.g., images 202). For example, the image processing system may generate a plurality of co-saliency maps 206 respectively corresponding to each of the plurality of images 202, which may be generated based on the common attributes (e.g., depiction of horses) as between the plurality of images 202. For example, portions of the plurality of images 202 that do not correspond to a depiction of a horse (such as a bride, which is only present in image 102) may be masked out of the co-saliency maps 206, and pixels determined to correspond to depictions of horses may be identified and set to a particular pixel value (e.g., 255, representing the color white). The control circuitry may generate a co-saliency map (e.g., at 108 of FIGS. 1-2) for the at least one image (e.g., image 102). In some embodiments, the image processing system may generate a bounding shape (e.g., bounding shape 110) surrounding the identified co-salient portion (e.g., the horse depicted in image 102) using any suitable technique (e.g., a minimum enclosing circle algorithm 208).

In some embodiments, each of bounding shapes 106 and 116 (FIGS. 1-2) may be generated based at least in part on a first weight representing a first quality score of the saliency parameters and a second weight representing a second quality score of the co-saliency parameters. In some embodiments, such as, for example, in the case of the at least one of the plurality of images being a video, the control circuitry may determine motion saliency parameters for the video across subsequent or consecutive frames, or multiple other frames of the video.

In some embodiments, the saliency and co-saliency parameters may be determined in any suitable order (e.g., the saliency parameters of at least one image may be determined prior to the co-saliency parameters, or the co-saliency images for a plurality of images may be determined prior to the saliency parameters) In some embodiments, the saliency parameters and the co-saliency parameters may be determined or computed by the image processing system in parallel (e.g., as permitted by hardware and/or software resources of one or more computing devices implementing the image processing system described herein).

At 1010, the control circuitry may identify an ROI in the at least one image (e.g., image 102 of FIGS. 1-2) based on the saliency parameters determined at 1006 and the co-saliency parameters determined at 1008. For example, the control circuitry may generate a fused bounding shape (e.g., fused bounding circle, or other bounding shape, 116 of FIG. 1) by combining at least a portion of the image associated with bounding circle (or other bounding shape) 106 with at least a portion of the image associated with bounding circle (or other bounding shape) 110. In some embodiments, the size and/or location of the fused bounding circle or other optimal bounding shape may be determined based on the techniques described in FIGS. 3-4. For example, the control circuitry may employ an iterative process to identify the size and/or location and/or coordinates of an optimal bounding shape or bounding circle, based at least in part on bounding shapes generated based on the saliency and co-saliency parameters, respectively.

At 1012, the control circuitry may perform radial blurring (e.g., in an automated manner) of the at least one of the plurality of images based on the identified ROI. For example, the control circuitry may perform a zoom blur or a spin blur, as shown in FIGS. 5-6. In some embodiments, the control circuitry may perform radial blurring to the at least one image (e.g., image 102) based on the bounding shape (e.g., bounding shapes 106, 110 and/or 116 of FIG. 1) and the protection mask (e.g., a circular protection mask or a silhouetted protection mask). Such radial blurring may utilize the determined saliency parameters (or cues, the determined co-saliency parameters (or cues), or any combination thereof, to generate output image(s) with radial blur in an automated manner.

For example, a bounding shape (e.g., 116 of FIG. 1) may be used as a protection mask during the blurring process, such that only the portions of the image outside bounding shape 116 may be blurred. If the control circuitry uses a circular protection mask in the radial blurring process, at least a portion of a foreground region (e.g., the soccer player in FIG. 5) and a background region (e.g., grass surrounding the soccer player in FIG. 5) inside the bounding shape may be protected from radial blurring. On the other hand, if the control circuitry uses a silhouetted protection mask, only the foreground portion (e.g., the soccer player in FIG. 5) may be protected from the radial blurring process. In some embodiments, in performing the radial blurring, pixels in regions to be blurred may be blended with adjacent or surrounding pixels (e.g. in the foreground and/or background), to create a blurring effect, pixels to be blurred may be modified in any suitable manner, Gaussian blurring may be employed, kernels or filters may be applied to one or more images using convolution techniques, or any other suitable technique may be employed.

In some embodiments, the control circuitry may, in performing radial blurring (e.g., automated radial blurring) to a particular image, perform radial blurring using a bounding shape's center as a blur center, and blending the original image and the blurred image using the protection mask. In some embodiments, automated radial blurring that can be deployed at large scale for groups of images and/or videos can be achieved by the techniques described herein. In some embodiments, when performing the radial blurring, the control circuitry may use salient regions of one or more images as a proxy for foreground regions.

At 1014, the control circuitry may generate for display at least one radially blurred image (e.g., images 734 and 736 of FIG. 7B) from the plurality of images (e.g., determined as related based metadata, and having had their saliency and co-saliency parameters analyzed). Such one or more radially blurred images may be generated for display automatically (e.g., without explicit user input requesting such images to be presented, such as, for example, if a user accesses a social media or social network application) or based on receiving a user request (e.g., selection of option 716 at user interface 700 of FIG. 7A). In some embodiments, prior to generating for display one or more radially blurred images, the control circuitry may present original versions of the image(s) to the user and may indicate to the user that such images are ranked as top candidate(s) for radial blurring, e.g., based on saliency and co-saliency parameters associated with such images. In such instance, the control circuitry may perform radial blurring based on a user request for such top candidate(s).

At 1016, the control circuitry may determine whether selection of at least one radially blurred image (e.g., selection of image 734 of FIG. 7B, and/or associated option 738, 740 or 742) is received. If so, processing may proceed to 1018; otherwise processing may return to 1006 of FIG. 10, e.g., to prepare one of more new or different images for automated radially blurring, by determining saliency and co-saliency parameters for such new or different images. In some embodiments, the control circuitry may return to 1006 from 1016 upon determining, for example, that a selection of at least one radially blurred image at 1016 is not received for a particular period of time, or a selection (or other input) has been received from the user indicating that he or she is not interested in any of the currently displayed images. In some embodiments, processing may remain at 106 (e.g., with the at least one radially blurred image displayed at 1014), to wait for user input.

At 1018, the control circuitry may perform one or more actions based on the selection received at 1016. For example, one or more of the radially blurred images may be uploaded (e.g., to a social media application), stored at a local or remote device, transmitted to another device or devices, and/or included in a message transmitted to one or more other users. In some embodiments, the images (e.g., images 734 and 736) may be ranked at least in part on the saliency parameters and the co-saliency parameters. For example, image 734 may be displayed at a more prominent position than image 736 at user interface 701. In some embodiments, the ranking may be based on the quality score of one or more of the saliency or co-saliency parameters, based on a size or location of a bounding shape associated with the images, or based on any other suitable criterion, or any combination thereof.

In some embodiments, saliency and co-saliency parameters for each candidate image may be determined (and/or radial blurring may be performed) by the image processing system prior to receiving user input at 1016. Alternatively, saliency and co-saliency parameters for each candidate image may be determined (and/or radial blurring may be performed) by the image processing system in response to (or after) receiving such user input at 1016. For example, the control circuitry may wait until a user specifies one or more particular images prior to determining saliency and co-saliency parameters (and/or prior to performing radial blurring) in relation to such one or more particular images.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
accessing a plurality of images;
determining saliency parameters based on at least one of the plurality of images;
determining co-saliency parameters based on the plurality of images;
identifying a region of interest (ROI) in the at least one of the plurality of images based on the saliency parameters and the co-saliency parameters, wherein identifying the ROI in the at least one of the plurality of images comprises:
generating, based on the saliency parameters, a first bounding shape enclosing a first portion of a particular image of the plurality of images;
generating, based on the co-saliency parameters, a second bounding shape enclosing a second portion of the particular image; and
generating, based on the first bounding shape and the second bounding shape, a fused bounding shape enclosing each of the first portion and the second portion of the image; and
performing automated radial blurring of the at least one of the plurality of images based on the identified ROI.

2. The method of claim 1, wherein generating the fused bounding shape is further based on a first weight representing a first quality score of the saliency parameters and a second weight representing a second quality score of the co-saliency parameters.

3. A computer-implemented method of claim 1, further comprising:
accessing a plurality of images;
determining saliency parameters based on at least one of the plurality of images;
determining co-saliency parameters based on the plurality of images;
determining, for a particular image of the plurality of images, parameters of an optimal bounding shape by:
iteratively updating initial parameters of the optimal bounding shape based on the saliency parameters and the co-saliency parameters, wherein the iterative updating is performed until the parameters of the optimal bounding shape converge to a particular threshold;
identifying a region of interest (ROI) in the at least one of the plurality of images based on the saliency parameters and the co-saliency parameters, wherein identifying the ROI is performed based at least in part on the optimal bounding shape; and
performing automated radial blurring of the at least one of the plurality of images based on the identified ROI.

4. The method of claim 3, wherein:
the optimal bounding shape is an optimal circle;
the parameters of the optimal circle comprise an x-coordinate of a center of the circle, a y-coordinate of the center of the circle, and a radius of an ROI of the optimal circle.

5. The method of claim 3, further comprising:
accessing metadata associated with a collection of images, the collection of images comprising the plurality of images;
receiving input of at least one criterion;
comparing the at least one criterion to the metadata of the collection of images;
determining that the plurality of images are associated with metadata corresponding to the at least one criterion; and
generating for display one or more options to enable selection of one or more of the radially blurred plurality of images.

6. The method of claim 5, wherein generating for display the one or more options comprises ranking the plurality of images based at least in part on the saliency parameters and the co-saliency parameters and generating for display one or more of the radially blurred plurality of images that are ranked highest.

7. The method of claim 1, wherein at least one of the plurality of images is a video, and the method further comprises:
determining a motion saliency parameter associated with the video;
wherein identifying the ROI is performed based at least in part on the motion saliency parameter, in addition to the saliency and co-saliency parameters.

8. The method of claim 1, wherein the automated radial blurring comprises a zoom blur or a spin blur.

9. The method of claim 1, wherein:
each respective image of the plurality of images comprises a background region and a foreground region, and a respective ROI of each of the plurality of images includes a portion of the background region and a portion of the foreground region; and
performing the automated radial blurring comprises:
for each respective image of the plurality of images, obtaining a respective blurred image; and
blending the respective blurred image with another version of the respective image using a protection mask, wherein:
the protection mask comprises a first protection mask or a second protection mask, the first protection mask being configured to protect from blurring the portion of the foreground region and the portion of the background region, and the second protection mask being configured to protect from blurring only the portion of the foreground region.

10. The method of claim 1, further comprising:
accessing metadata associated with a collection of images, the collection of images comprising the plurality of images;
receiving input of at least one criterion;
comparing the at least one criterion to the metadata of the collection of images;
determining that the plurality of images are associated with metadata corresponding to the at least one criterion; and
generating for display one or more options to enable selection of one or more of the radially blurred plurality of images.

11. The method of claim 10, wherein generating for display the one or more options comprises ranking the plurality of images based at least in part on the saliency parameters and the co-saliency parameters and generating for display one or more of the radially blurred plurality of images that are ranked highest.

12. A computer-implemented system, comprising:
input/output (I/O) circuitry configured to:
access a plurality of images;
control circuitry configured to:
determine saliency parameters based on at least one of the plurality of images;
determine co-saliency parameters based on the plurality of images;
identify a region of interest (ROI) in the at least one of the plurality of images based on the saliency parameters and the co-saliency parameters, wherein the control circuitry is configured to identify the ROI in the at least one of the plurality of images by:
generating, based on the saliency parameters, a first bounding shape enclosing a first portion of a particular image of the plurality of images;
generating, based on the co-saliency parameters, a second bounding shape enclosing a second portion of the particular image; and
generating, based on the first bounding shape and the second bounding shape, a fused bounding shape enclosing each of the first portion and the second portion of the image; and
perform automated radial blurring of the at least one of the plurality of images based on the identified ROI.

13. The system of claim 12, wherein the control circuitry is configured to generate the fused bounding shape further based on a first weight representing a first quality score of the saliency parameters and a second weight representing a second quality score of the co-saliency parameters.

14. The system of claim 12, wherein the control circuitry is further configured to:
determine, for a particular image of the plurality of images, parameters of an optimal bounding shape by:
iteratively updating initial parameters of the optimal bounding shape based on the saliency parameters and the co-saliency parameters, wherein the iterative updating is performed until the parameters of the optimal bounding shape converge to a particular threshold; and
identify the ROI based at least in part on the optimal bounding shape.

15. The system of claim 14, wherein:
the optimal bounding shape is an optimal circle;
the parameters of the optimal circle comprise an x-coordinate of a center of the circle, a y-coordinate of the center of the circle, and a radius of an ROI of the optimal circle.

16. The system of claim 12, wherein at least one of the plurality of images is a video, and the control circuitry is further configured to:
determine a motion saliency parameter associated with the video; and
identify the ROI is performed based at least in part on the motion saliency parameter, in addition to the saliency and co-saliency parameters.

17. The system of claim 12, wherein the automated radial blurring comprises a zoom blur or a spin blur.

18. The system of claim 12, wherein:
each respective image of the plurality of images comprises a background region and a foreground region, and a respective ROI of each of the plurality of images includes a portion of the background region and a portion of the foreground region; and
the control circuitry performs the automated radial blurring by:
for each respective image of the plurality of images, obtain a respective blurred image; and
blend the respective blurred image with another version of the respective image using a protection mask, wherein:
the protection mask comprises a first protection mask or a second protection mask, the first protection mask being configured to protect from blurring the portion of the foreground region and the portion of the background region, and the second protection mask being configured to protect from blurring only the portion of the foreground region.

19. The system of claim 12, wherein the control circuitry is further configured to:
access metadata associated with a collection of images, the collection of images comprising the plurality of images;
receive input of at least one criterion;
compare the at least one criterion to the metadata of the collection of images;
determine that the plurality of images are associated with metadata corresponding to the at least one criterion; and
generate for display one or more options to enable selection of one or more of the radially blurred plurality of images.

20. The system of claim 19, wherein the control circuitry is further configured to generate for display the one or more options by ranking the plurality of images based at least in part on the saliency parameters and the co-saliency parameters and generating for display one or more of the radially blurred plurality of images that are ranked highest.

* * * * *